US 8,642,970 B2

(12) United States Patent
Iwakiri et al.

(10) Patent No.: US 8,642,970 B2
(45) Date of Patent: Feb. 4, 2014

(54) RADIOGRAPHIC IMAGE DETECTING APPARATUS AND RADIOGRAPHIC IMAGE CAPTURING SYSTEM

(75) Inventors: Naoto Iwakiri, Ashigarakami-gun (JP); Atsuo Ishizuka, Ashigarakami-gun (JP); Naoyuki Nishino, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 245 days.

(21) Appl. No.: 13/302,723

(22) Filed: Nov. 22, 2011

(65) Prior Publication Data

US 2012/0132820 A1 May 31, 2012

(30) Foreign Application Priority Data

Nov. 26, 2010 (JP) ................................ 2010-264103
Nov. 9, 2011 (JP) ................................ 2011-245086

(51) Int. Cl.
 *G01T 1/24* (2006.01)
(52) U.S. Cl.
 USPC ................................ 250/370.08; 250/370.01
(58) Field of Classification Search
 USPC ..................... 250/336.1, 370.01, 370.08, 394
 See application file for complete search history.

(56) References Cited

U.S. PATENT DOCUMENTS

| 2005/0173618 | A1* | 8/2005 | Sugiyama et al. | 250/208.1 |
| 2005/0174612 | A1* | 8/2005 | Sugiyama et al. | 358/482 |
| 2009/0159784 | A1* | 6/2009 | Kobayashi et al. | 250/208.1 |
| 2010/0123812 | A1* | 5/2010 | Sekiguchi et al. | 348/308 |
| 2011/0168892 | A1* | 7/2011 | Steadman et al. | 250/336.1 |

FOREIGN PATENT DOCUMENTS

| JP | 2009-219538 A | 10/2009 |
| JP | 2010-212925 A | 9/2010 |

* cited by examiner

*Primary Examiner* — Mark R Gaworecki
(74) *Attorney, Agent, or Firm* — Sughrue Mion, PLLC

(57) ABSTRACT

A radiographic image detecting apparatus and a radiographic image capturing system are provided. The radiographic image detecting apparatus includes a plurality of photoelectric conversion elements for generating electric charge by emission of radiation, a bias line through which a bias voltage is supplied to the photoelectric conversion elements, a power supply for applying the bias voltage to the photoelectric conversion elements through the bias line, a current detector for detecting a bias current flowing through the bias line, and a reading circuit including an amplifying circuit. The current detector includes a current mirror circuit connected between the bias line connected to the photoelectric conversion elements and the power supply.

20 Claims, 16 Drawing Sheets

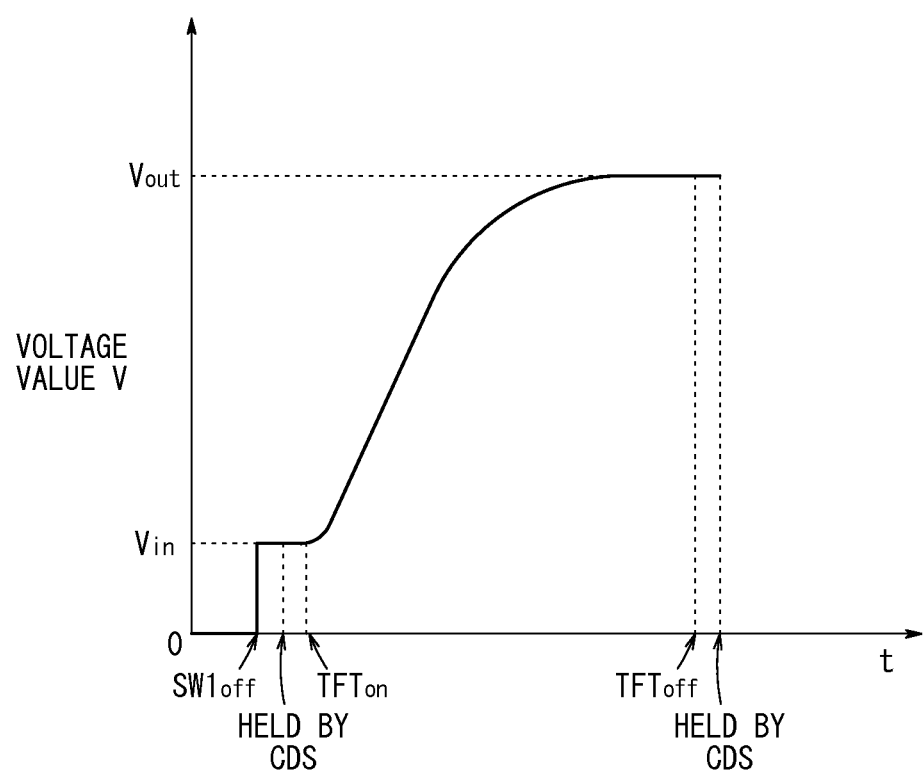

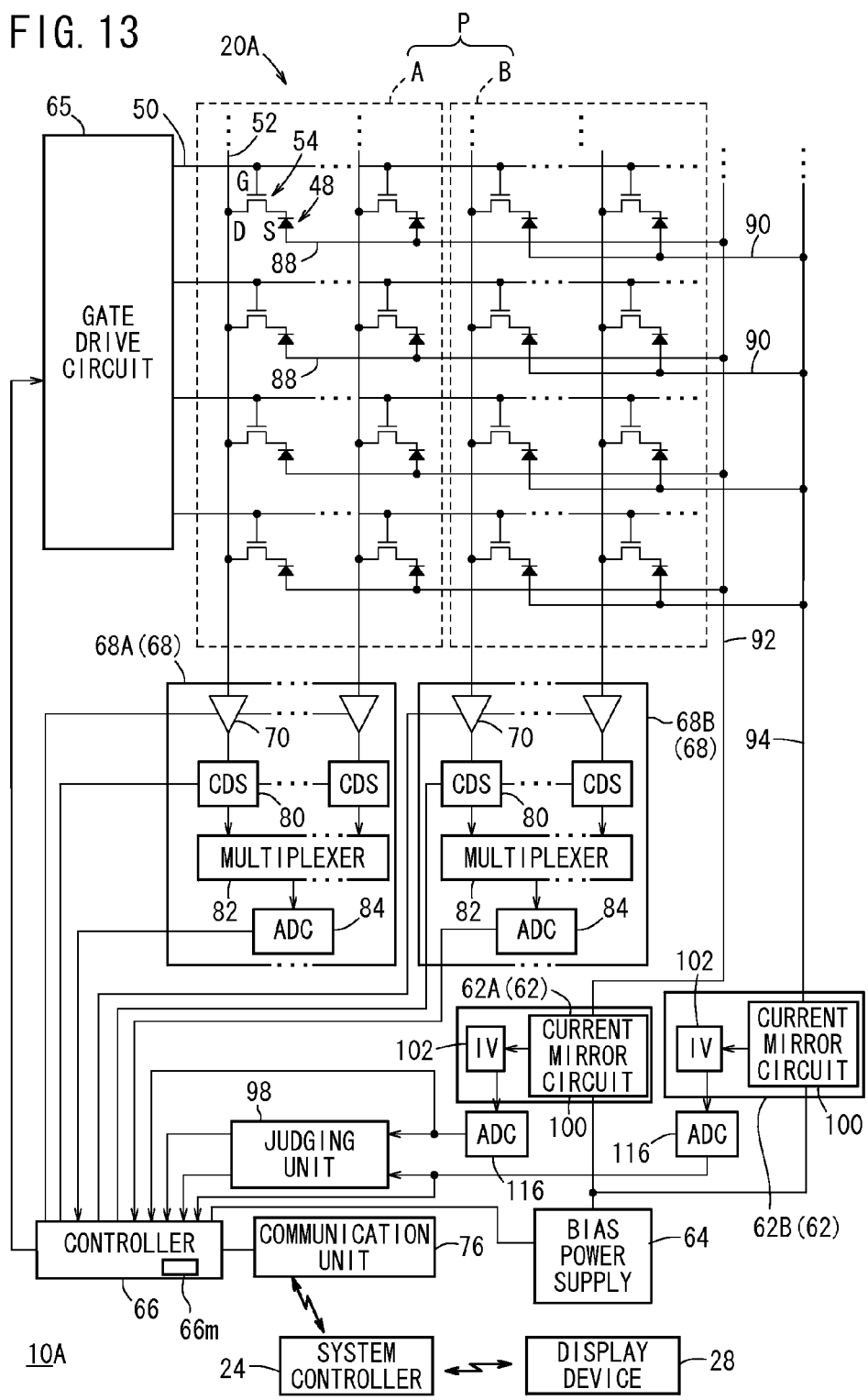

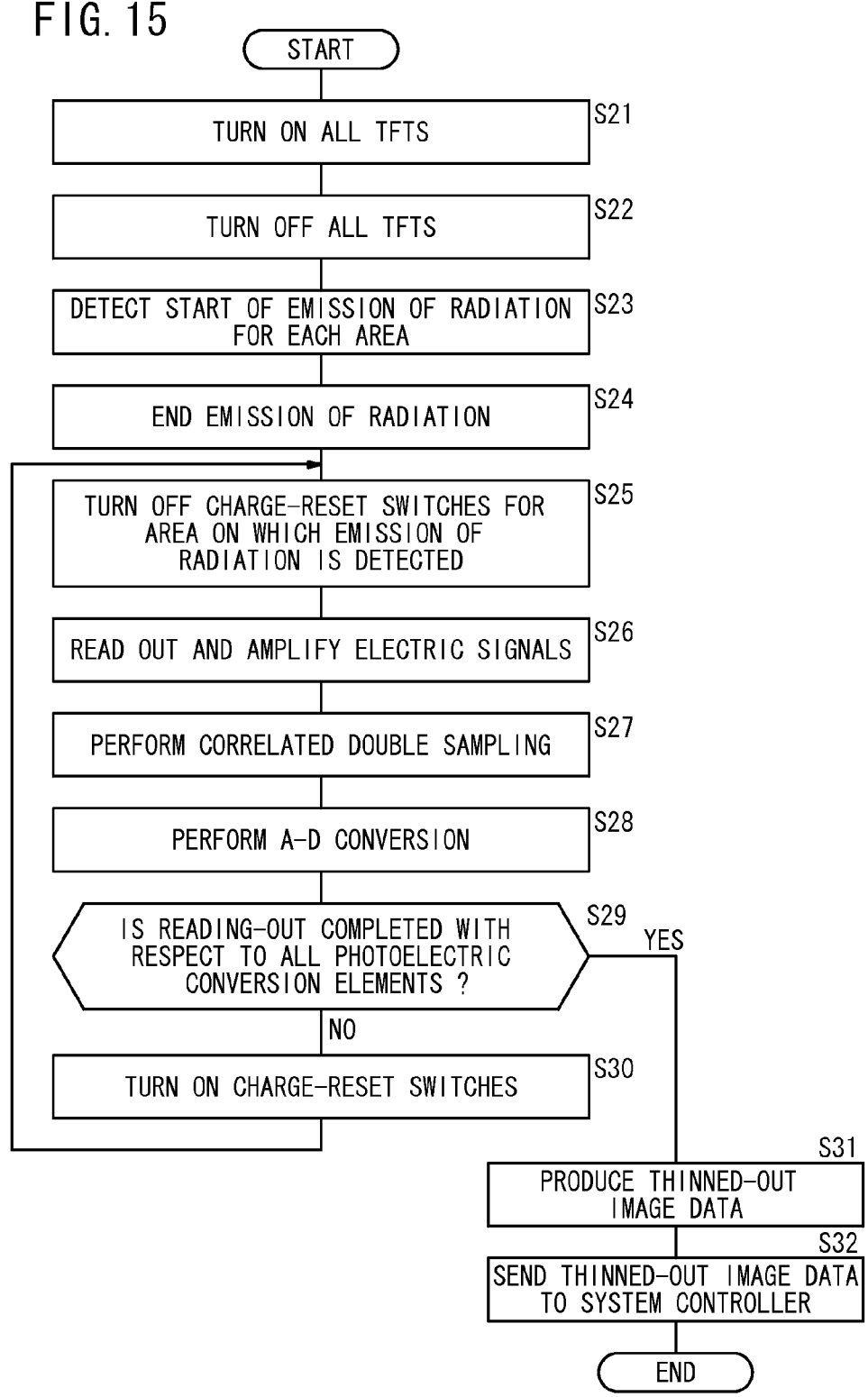

RADIOGRAPHIC IMAGE DETECTING APPARATUS AND RADIOGRAPHIC IMAGE CAPTURING SYSTEM

CROSS-REFERENCE TO RELATED APPLICATION

This application is based upon and claims the benefit of priority from Japanese Patent Applications No. 2010-264103 filed on Nov. 26, 2010 and No. 2011-245086 filed on Nov. 9, 2011, of which the contents are incorporated herein by reference.

BACKGROUND OF THE INVENTION

1. Field of the Invention

The present invention relates to a radiographic image detecting apparatus for detecting radiation that has passed through a human body, and a radiographic image capturing system which incorporates such a radiographic image detecting apparatus therein.

2. Description of the Related Art

In the medical field, there have been employed portable radiographic image detecting apparatus such as an FPD (Flat Panel Detector) or the like for detecting the intensity of radiation that has passed through a human body thereby to capture images of regions in the human body. The FPD, which is also referred to as "electronic cassette", is capable of capturing an image of a region in a patient while the patient is lying on the bed or the like. The FPD is also capable of adjusting a region to be imaged by changing its own position. Consequently, the FPD can be flexibly used for image patients who are unable to move their own bodies.

Under such circumstances, various radiographic image detecting apparatus have been proposed in the art. One such radiographic image detecting apparatus is of the direct conversion in which photoelectric conversion elements generates electric charges in response to radiation applied thereto and then converts the generated electric charges into electric signals. Another radiographic image detecting apparatus is of the indirect conversion in which a scintillator or the like converts radiation applied thereto into an electromagnetic wave such as visible light or the like having a wavelength other than the wavelength of the radiation, and photoelectric conversion elements such as photodiodes or the like generate electric charges in response to the electromagnetic wave applied thereto and converts the generated electric charges into electric signals.

In such radiographic image detecting apparatus, the photoelectric conversion elements are disposed in respective areas delimited by a plurality of scanning lines and a plurality of signal lines that are disposed on a substrate such as a glass substrate, a flexible substrate, or the like so as to intersect one another. Radiation or an electromagnetic wave converted from radiation is applied to the photoelectric conversion elements, whereby the photoelectric conversion elements generate and store electric charges. The stored electric charges are read from the photoelectric conversion elements, i.e., pixels, through the signal lines as electric signals.

The radiographic image detecting apparatus in the form of FPDs are, however, problematic in that if a wide dynamic range for covering various radiation doses ranging from a low radiation dose to a high radiation dose is to be maintained, then since components of amplifying circuits and other electric circuits for processing electric signals tend to generate noise such as thermal noise, shot noise, or the like, the SN ratio is lowered particularly in a low radiation dose range, resulting in a reduction of the quality of produced radiographic images.

Japanese Laid-Open Patent Publication No. 2009-219538 (hereinafter referred to as JP2009-219538A) discloses a technology for solving the above problem. According to the disclosed technology, attention has been focused on the fact that the amounts of bias currents flowing through bias lines from the photoelectric conversion elements in order to bias the photoelectric conversion elements vary depending on the dose of radiation applied to the photoelectric conversion elements. Based on the fact, the dose of radiation applied to the photoelectric conversion elements is calculated, and the gain of an amplifying circuit at the time electric signals are read from the photoelectric conversion elements is established based on the calculated dose of the radiation.

Japanese Laid-Open Patent Publication No. 2010-212925 (hereinafter referred to as JP2010-212925A) discloses a radiographic image capturing system wherein a detector includes a plurality of areas, and current detectors according to JP2009-219538A for detecting currents flowing through the bias lines for the respective areas, and no image data are read from those areas that do not detect an applied radiation, for thereby shortening the time required to send image data.

According to JP2009-219538A and JP2010-212925A, for calculating the amounts of bias currents, the bias lines through which the bias currents for the respective photoelectric conversion elements flow are converged on a line, and a resistor having a large resistance value of 100 [k$\Omega$] or 1 [M$\Omega$] is connected in series to the line. Then, a voltage generated across the series-connected resistor is measured by a differential amplifier, because the bias currents are weak, i.e., in the order of microampere.

SUMMARY OF THE INVENTION

The photosensitivity (hereinafter referred to as "sensitivity") of a photoelectric conversion element changes depending on a bias voltage applied thereto. If the amount of bias current changes as the dose of radiation changes, then the voltage drop across the resistor also changes. The voltage drop changes, and then a bias voltage that is substantially applied to the photoelectric conversion element also changes, causing the sensitivity of the photoelectric conversion element to change. Therefore, the quality of a captured radiographic image is degraded accordingly. Specifically, if the amount of bias current increases, the voltage drop increases, and the bias voltage decreases, resulting in a reduction in the sensitivity. Conversely, if the amount of bias current decreases, the voltage drop decreases, and the bias voltage increases, resulting in an increase in the sensitivity.

It is an object of the present invention to provide a radiographic image detecting apparatus which is capable of keeping the sensitivity of photoelectric conversion elements constant regardless of a change in the amounts of bias currents that flow through the photoelectric conversion elements depending on the dose of radiation applied thereto, and a radiographic image capturing system which prevents the quality of radiographic images captured thereby from being degraded.

According to the present invention, there is provided a radiographic image detecting apparatus comprising: a plurality of photoelectric conversion elements for generating electric charge by emission of radiation; a bias line through which a bias voltage is supplied to the photoelectric conversion elements; a power supply for applying the bias voltage to the photoelectric conversion elements through the bias line; a current detector for detecting a bias current flowing through the bias line; and a reading circuit including an amplifying circuit having a gain, wherein in a case where an electric signal due to the electric charge is read out from the photoelectric conversion elements through a signal line, the gain at a time of reading out the electric signal is set based on a current value detected by the current detector at a time of emission of the radiation, wherein the current detector includes a current mirror circuit connected between the bias line connected to the photoelectric conversion elements and the power supply.

Also, according to the present invention, there is provided a radiographic image detecting apparatus comprising: a detector section including a plurality of areas and on which a plurality of photoelectric conversion elements for generating electric charge depending on an applied amount of radiation are arranged in a two-dimensional array; a power supply for applying a bias voltage to the photoelectric conversion elements through bias lines; a current detector for detecting currents flowing through the bias lines, for each of the areas; a reading circuit for reading out electric charge generated and accumulated in the photoelectric conversion elements and converting the read electric charge into an electric signal, for each of the areas; and a controller for detecting start of emission of the radiation for each of the areas, based on increase in the current flowing through the bias lines detected by the current detector, and for controlling the reading circuit to read out only the electric signal of the area on which the emission of the radiation is detected, wherein the current detector includes a current mirror circuit connected between the bias lines connected to the photoelectric conversion elements and the power supply.

In this case, the current mirror circuit may include: an input device connected to the photoelectric conversion elements and through which an input current flows; and output devices for mirroring the input current flowing through the input device and flowing an output current, and wherein the output devices may be connected in parallel to each other such that the current mirror circuit is a multistage current mirror circuit.

Also, preferably, the current mirror circuit should include: an input MOSFET connected to the photoelectric conversion elements and through which an input current flows; and an output MOSFET for mirroring the input current flowing through the input MOSFET and flowing an output current, and wherein the value of width/length of the channel of the input MOSFET should be larger than the value of width/length of the channel of the output MOSFET.

Further, preferably, the current mirror circuit should be arranged on a substrate with the photoelectric conversion elements arranged thereon.

Still further, preferably, the current mirror circuit should be formed as an integrated circuit.

Yet further, preferably, the current detector should include: the current mirror circuit; and a current-voltage converting circuit connected to the current mirror circuit, and wherein the current mirror circuit and the current-voltage converting circuit should be formed as one integrated circuit.

In this case, preferably, the current-voltage converting circuit should include an operational amplifier and a resistor connected to an input terminal and an output terminal of the operational amplifier, or the current-voltage converting circuit should be formed as a charge amplifier including an operational amplifier and a capacitor connected to the input terminal and the output terminal of the operational amplifier.

Also, the controller may detect start and/or end of emission of the radiation based on increase and decrease in a current flowing through the bias line detected by the current detector.

Also, according to the present invention, there is provided a radiographic image capturing system comprising: the radiographic image detecting apparatus as described above; and an image processor for forming a radiographic image based on electric signals which are read out from the photoelectric conversion elements and then amplified, the electric signals being output from the radiographic image detecting apparatus at the time of reading out the electric signals.

In the radiographic image capturing system, preferably, the radiographic image detecting apparatus and the image processor should be connected to each other by a wireless communication.

According to the present invention, the current mirror circuit is used as the current detector for detecting the bias current of the photoelectric conversion elements. Even if the amount of the bias current, i.e. the detected current, varies depending on increase or decrease in the applied amount of radiation, the voltage at the input side (diode-connected side) of the current mirror circuit hardly changes. Thus, during the application of the radiation, the bias voltage is kept substantially constant with respect to the photoelectric conversion elements, and the photosensitivity of the photoelectric conversion elements does not change. Therefore, even if the bias current flowing through the photoelectric conversion elements varies depending on the dose of the radiation, the photosensitivity does not vary, and thus the quality of a radiographic image is not deteriorated.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 12 is a graph showing by way of example the manner in which a voltage output from an amplifying circuit changes with time;

FIG. 13 is a circuit diagram, partly in block form, of a radiographic image capturing system according to another embodiment of the present invention;

FIG. 15 is a flowchart of an operation sequence of a controller of a radiographic image detecting apparatus according to the other embodiment.

DESCRIPTION OF THE PREFERRED EMBODIMENTS

Radiographic image detecting apparatus and radiographic image capturing systems according to preferred embodiments of the present invention will be described in detail below with reference to the accompanying drawings.

Figure 1:
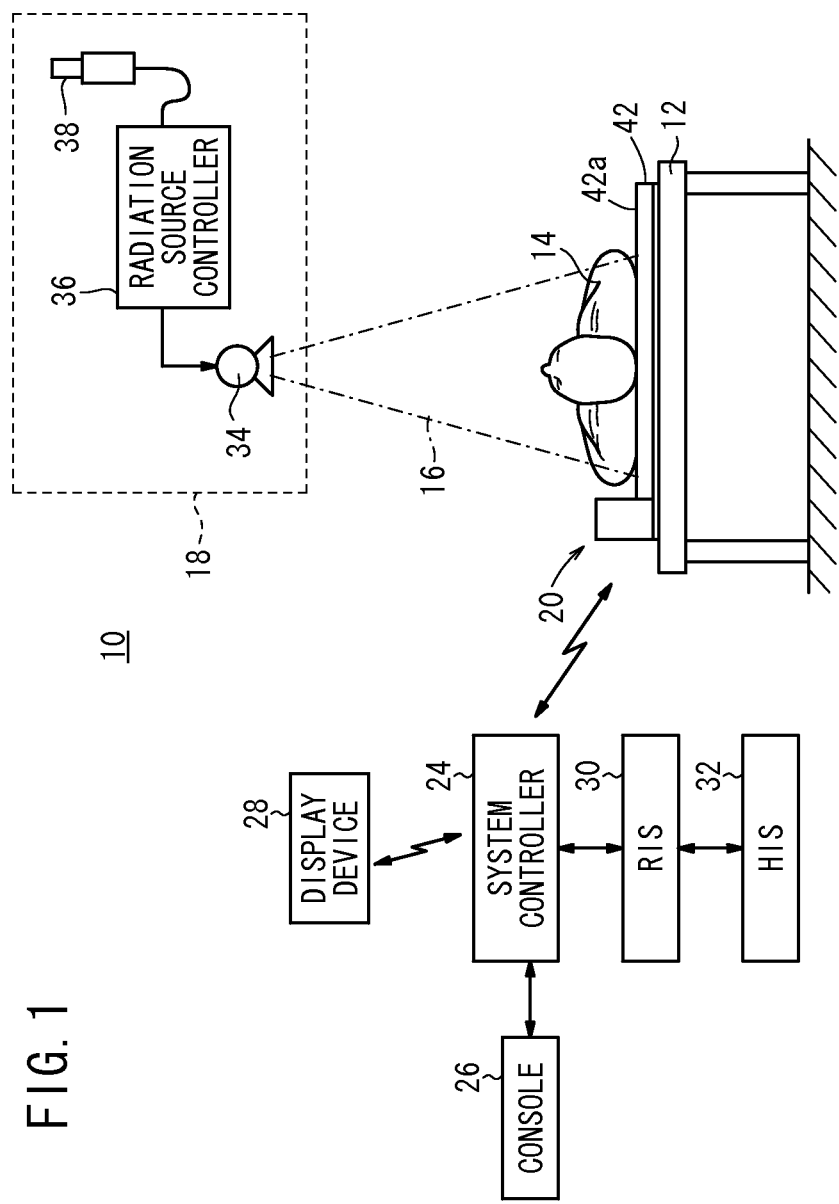
FIG. 1 is a schematic view, partly in block form, of a radiographic image capturing system according to an embodiment of the present invention.

FIG. 1 is a schematic view, partly in block form, of a radiographic image capturing system 10 according to an embodiment of the present invention.

As shown in FIG. 1, the radiographic image capturing system 10 includes a radiation apparatus 18 for applying radiation 16 to a subject 14 such as a patient lying on an image capturing base 12 such as a bed or the like, an electronic cassette (radiographic image detecting apparatus) 20 for detecting the radiation 16 that has passed through the subject 14 and converting the detected radiation into a radiographic image, a system controller 24 for totally controlling the radiographic image capturing system 10, the system controller 24 also functioning as an image processor, a console 26 for receiving input operations from the doctor or radiological technician (hereinafter referred to as "user"), and a display device 28 for displaying captured radiographic images, etc.

The system controller 24, the electronic cassette 20, and the display device 28 send signals to each other and receive signals from each other by way of a wireless LAN according to standards such as UWB (Ultra-Wide Band), IEEE802.11.a/b/g/n. or the like, or wireless communications using milliwaves. The system controller 24, the electronic cassette 20, and the display device 28 may send signals to each other and receive signals from each other by way of wired communications through cables.

The system controller 24 is connected to a radiology information system (RIS) 30 which generally manages radiographic image information handled by the radiological department of a hospital and other information. The RIS 30 is connected to a hospital information system (HIS) 32 which generally manages medical information in the hospital.

The radiation apparatus 18 has a radiation source 34 for emitting the radiation 16, a radiation source controller 36 for controlling the radiation source 34, and a radiation switch 38. The radiation source 34 applies the radiation 16 to the electronic cassette 20. The radiation 16 that is emitted from the radiation source 34 may be an X-ray, an _ ray, a _ ray, a _ ray, an electron beam, or the like. The radiation switch 38 can be pushed in two strokes, i.e., it can be pushed in a half stroke and a full stroke. In a case where the radiation switch 38 is pushed in the half stroke by a user, the radiation source controller 36 makes the radiation source 34 ready to emit the radiation 16. In a case where the radiation switch 38 is pushed in the full stroke, the radiation source controller 36 causes the radiation source 34 to start emitting the radiation 16.

The radiation source controller 36 includes an input device, not shown, which can be operated by the user to set various values including an irradiation time of the radiation 16, a tube voltage and a tube current of the radiation source 34, etc. Based on the set values, the radiation source controller 36 controls the radiation source 34 to emit the radiation 16.

Figure 2:
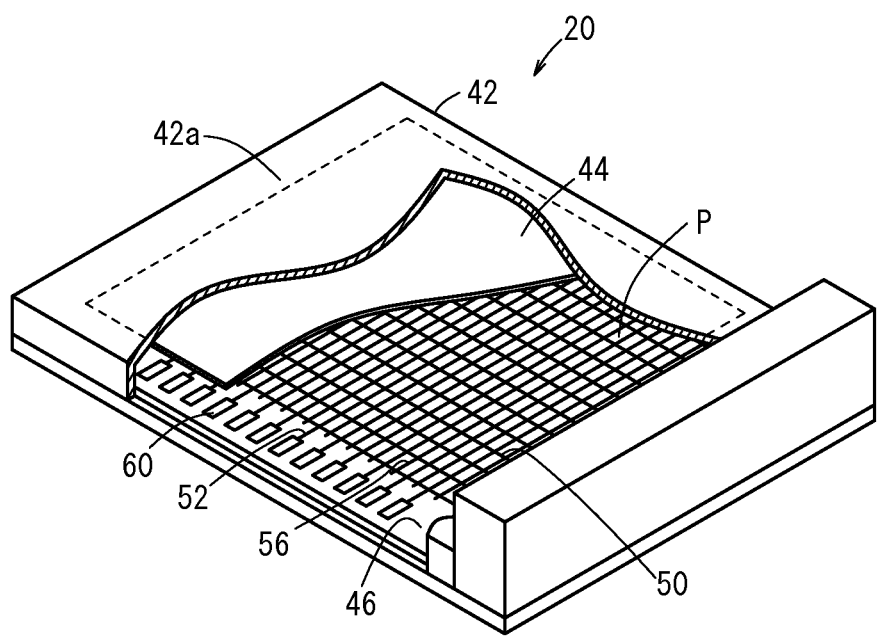
FIG. 2 is a perspective view, partly broken away, of a radiographic image detecting apparatus according to the embodiment.

FIG. 2 shows in perspective, partly broken away, the electronic cassette 20 shown in FIG. 1.

The electronic cassette 20 is in the form of a cassette-type apparatus including a scintillator 44, a substrate 46, and other components housed in a casing 42.

In the present embodiment, the electronic cassette 20 will be described as an indirect conversion radiographic image detecting apparatus wherein the scintillator 44 converts the applied radiation 16 (see FIG. 1) into an electromagnetic wave such as visible light or the like having a wavelength other than the wavelength of the radiation 16, and photoelectric conversion elements 48, to be described later, generate electric charges in response to the electromagnetic wave applied thereto and convert the generated electric charges into electric signals. However, without the use of such a scintillator 44, the electronic cassette 20 may alternatively be a direct conversion radiographic image detecting apparatus wherein photoelectric conversion elements directly generate electric charges in response to the radiation 16 applied thereto and convert the generated electric charges into electric signals.

The casing 42 has a surface 42a irradiated with the radiation 16. At least the surface 42a of the casing 42 is made of carbon plate, plastic, or the like which is permeable to the radiation 16. The casing 42 houses therein the scintillator 44, the substrate 46, and other components. In the present embodiment, an antenna device, not shown, for sending information to and receiving information from the system controller 24 via a wireless link is embedded in a side wall of the casing 42, for example.

The scintillator 44 is bonded to a detector section P of the substrate 46. The scintillator 44, which is made mainly of a fluorescent material, converts the radiation 16 applied thereto into an electromagnetic wave in a wavelength range from 300 to 800 nm, i.e., an electromagnetic wave mainly as visible light, and emits the electromagnetic wave.

Figure 3:
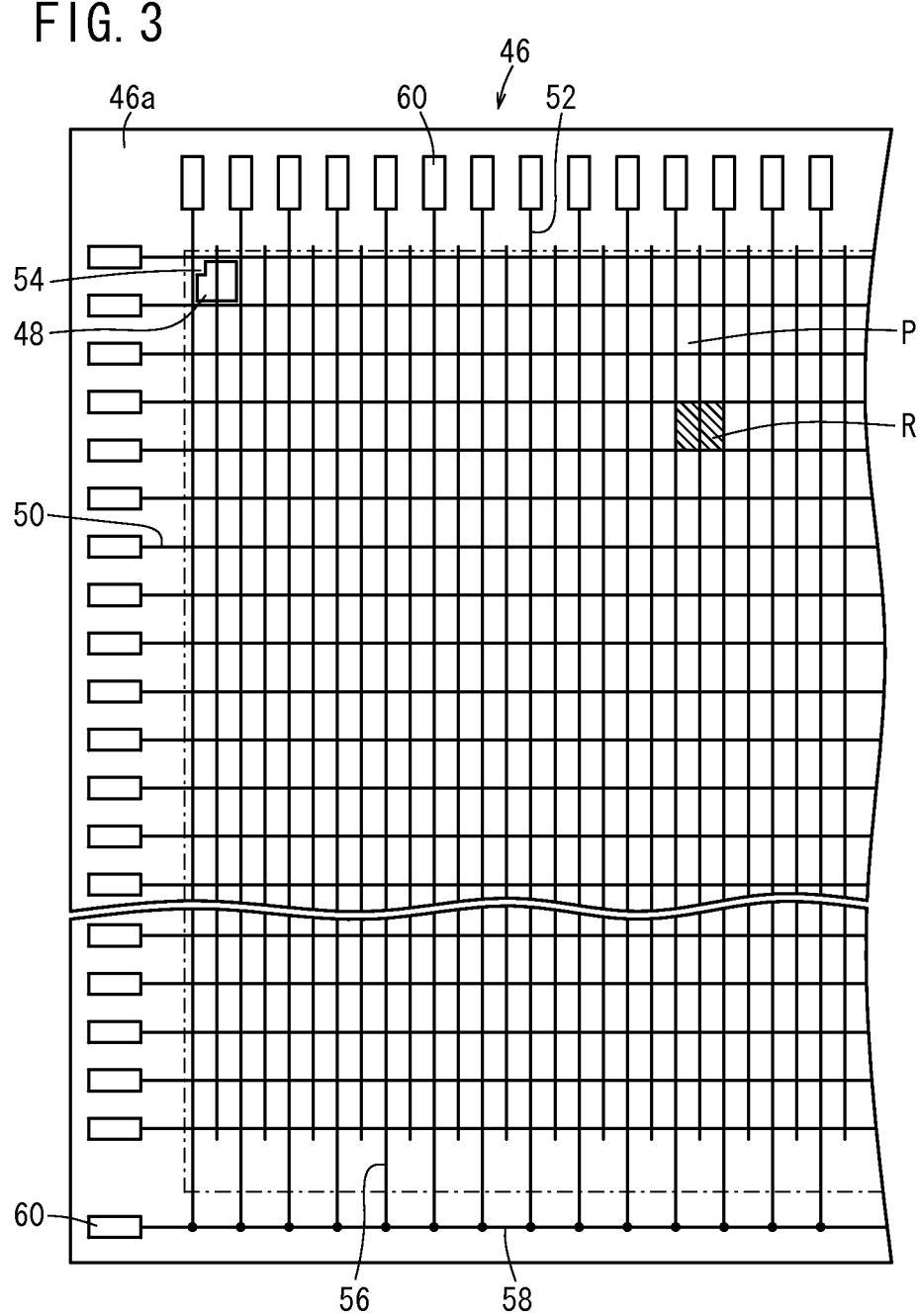
FIG. 3 is an enlarged fragmentary view of photoelectric transistors and thin-film transistors or the like in small areas on a substrate of the radiographic image detecting apparatus shown in FIG. 2.

The substrate 46 comprises a glass substrate. As shown in FIG. 3, a plurality of gate lines, i.e., scanning lines, 50 and a plurality of signal lines 52 are disposed on a surface 46a of the substrate 46 that faces the scintillator 44, such that the lines intersect one another. The gate lines 50 and the signal lines 52 on the surface 46a of the substrate 46 delimit a plurality of small areas R where the respective photoelectric conversion elements 48 are disposed. The overall areas R with the photoelectric conversion elements 48 disposed therein, i.e., a region indicated by the dot-and-dash lines in FIG. 3, serves as the detector section P.

Figure 4:
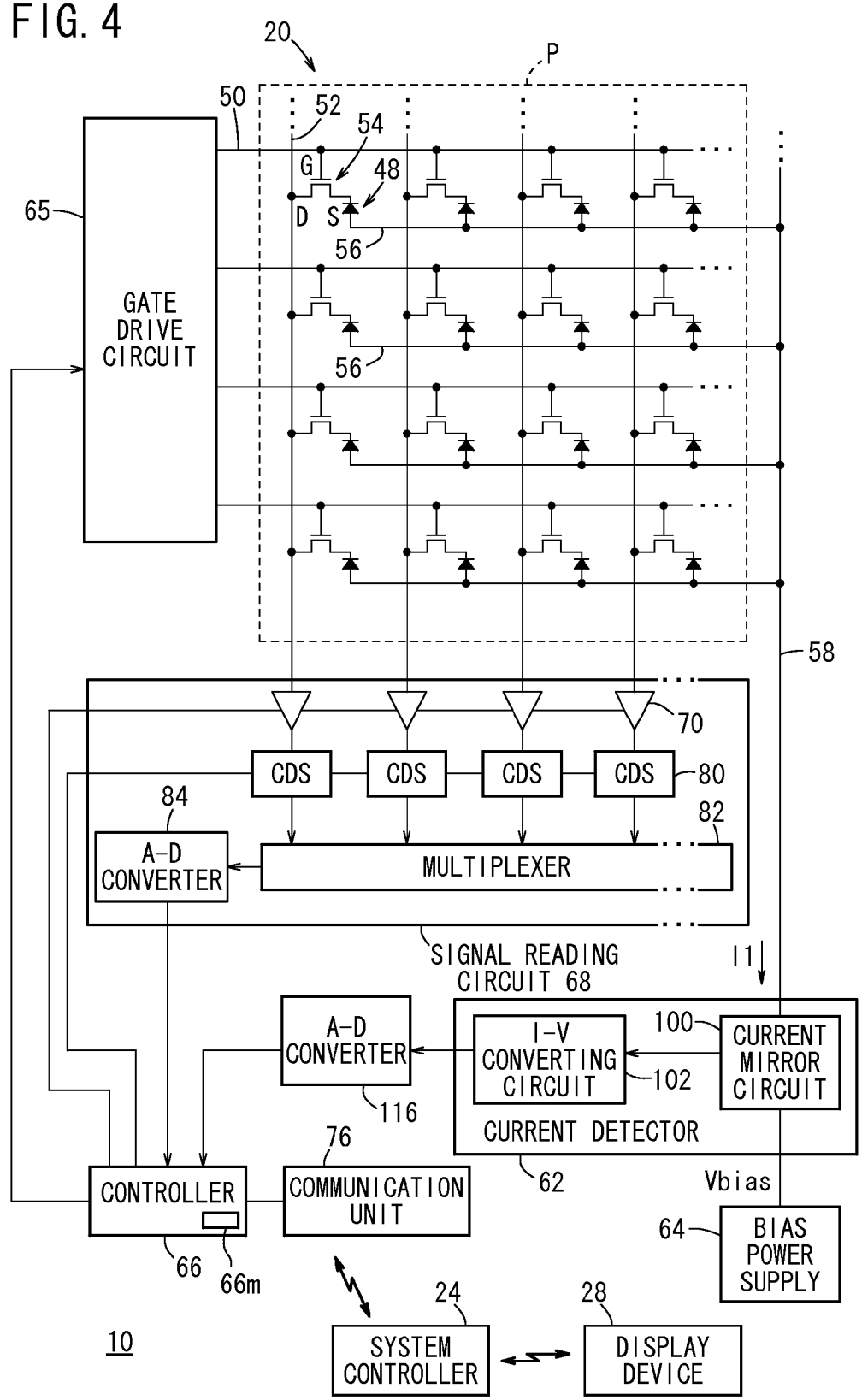
FIG. 4 is a circuit diagram, partly in block form, of the radiographic image capturing system according to the embodiment.

In the present embodiment, each of the photoelectric conversion elements 48 comprises a PIN photodiode. Alternatively, each of the photoelectric conversion elements 48 may comprise a phototransistor or the like. As shown in FIG. 4, each of the photoelectric conversion elements 48 is connected to a thin-film transistor (TFT) 54 serving as a switching device, which is connected to one of the signal lines 52.

As shown in FIG. 4, the TFT 54 has a gate electrode (hereinafter also referred to as "gate") G, which is made of Al, Cr, or the like, connected to one of the gate lines 50. The gate G and the gate line 50 are integrally deposited on the surface 46a of the substrate 46. A gate insulating layer made of silicon nitride (SiNx) or the like is deposited on the gate G and the surface 46a. The TFT 54 includes a source electrode (hereinafter also referred to as "source") S connected to the cathode electrode (hereinafter also referred to as "cathode") of the photoelectric conversion element 48 and a drain electrode (hereinafter also referred to as "drain") D formed integrally with one of the signal lines 52. The source S and the drain D are deposited on the gate insulating layer over the gate G. The structural details of the photoelectric conversion element 48 and the TFT 54 are known from JP2009-219538A, for example, and thus will not be described below. Though the substrate 46 comprises a glass substrate in the present embodiment, it may comprise a flexible substrate of synthetic resin.

The photoelectric conversion element 48 includes an anode electrode whose upper surface is connected to a bias line 56 which applies a reverse bias voltage to the photoelectric conversion element 48 through the anode electrode.

As shown in FIG. 4, a single bias line 56 is connected to each horizontal row of photoelectric conversion elements 48. The bias lines 56 connected to the corresponding rows of photoelectric conversion elements 48 extend parallel to the respective gate lines 50, and are connected to a single common line 58 (also referred to as a bias line or a common bias line) outside the detector section P. The bias lines 56 and the common line 58 comprise metal lines of small electric resistance.

The gate lines 50, the signal lines 52, and the common line 58 are connected to input/output terminals or pads 60 which are disposed on the substrate 46 near its marginal edges. Drive circuits etc. disposed on or connected to the substrate 46 are connected to the input/output terminals 60.

Figure 5:
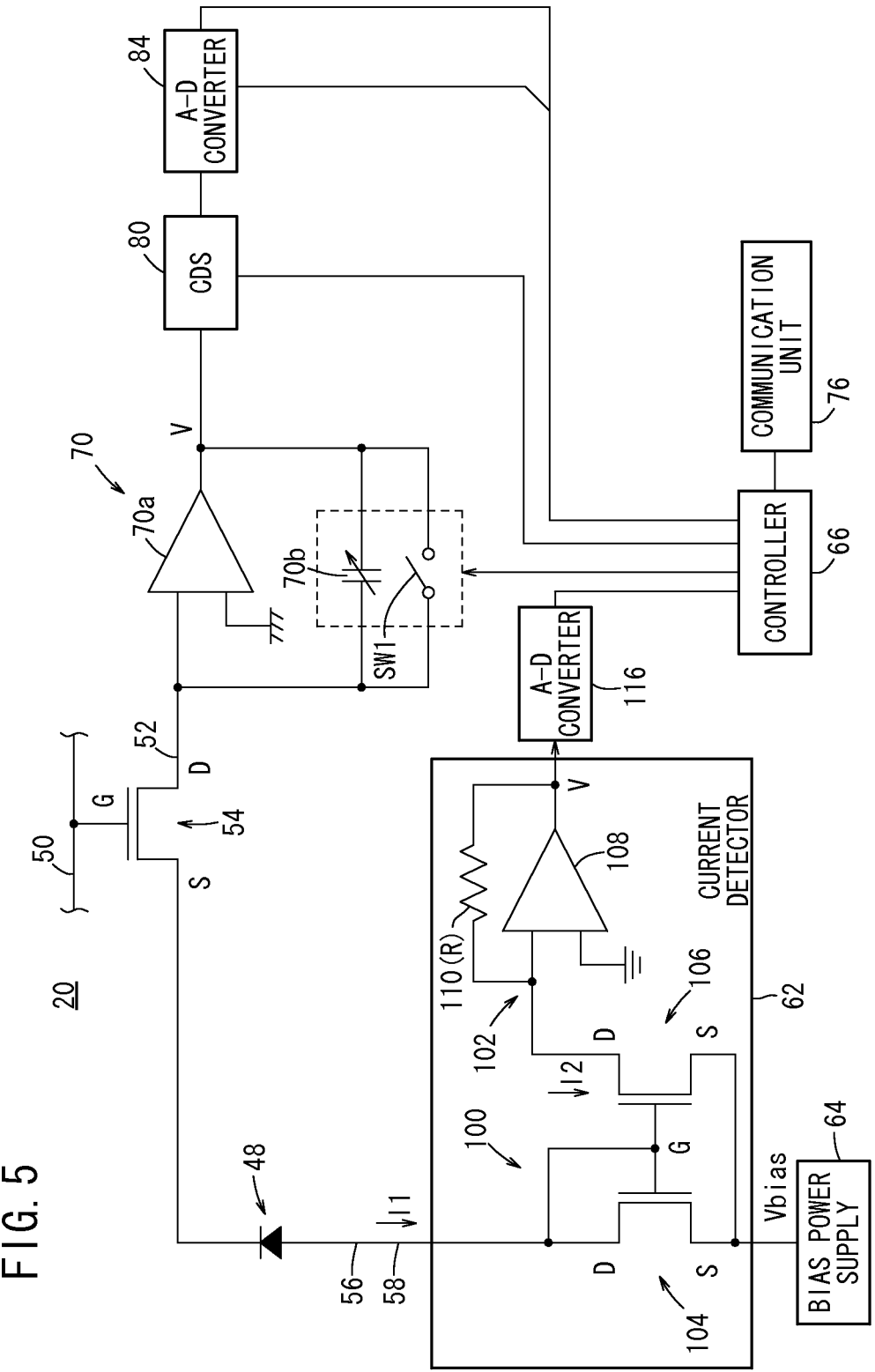
FIG. 5 is a circuit diagram, partly in block form, of a pixel of the radiographic image detecting apparatus according to the embodiment.

A circuit arrangement of the electronic cassette 20 will be described in detail below. FIG. 4 is an equivalent circuit diagram of the electronic cassette 20 according to the present embodiment, and FIG. 5 is an equivalent circuit diagram of one pixel of the detector section P of the substrate 46.

As described above, the anode electrode of each of the photoelectric conversion elements 48 in the detector section P is connected to one of the bias lines 56, which are connected to the single common line 58. The common line 58 is connected to a bias power supply (hereinafter also referred to as "power supply") 64 through a current detector (current detecting circuit) 62. The bias power supply 64 applies a reverse bias voltage Vbias to the photoelectric conversion elements 48 through the current detector 62, the common line 58, and the bias lines 56.

In the present embodiment, the bias lines 56 are connected to the P layers of the PIN photoelectric conversion elements 48 through the anode electrodes thereof, and the bias power supply 64 applies a negative voltage, which may be at least a predetermined voltage lower than the voltage applied to the cathode electrodes of the photoelectric conversion elements 48, as the reverse bias voltage to the anode electrodes of the photoelectric conversion elements 48 through the bias lines 56.

If the photoelectric conversion elements 48 have an inverse PIN stack structure with their polarity inverted and the bias lines 56 are connected to the cathode electrodes of the photoelectric conversion elements 48, then the bias power supply 64 applies a positive voltage, which may be at least a predetermined voltage higher than the voltage applied to the anode electrodes of the photoelectric conversion elements 48, as the reverse bias voltage to the cathode electrodes of the photoelectric conversion elements 48 through the bias lines 56. According to this modification, the photoelectric conversion elements 48 are connected to the bias power supply 64 in a reverse orientation with respect to the case of FIGS. 4 and 5.

As shown in FIGS. 4 and 5, the current detector 62 serves to detect a current flowing through the common line 58 which is connected to the bias lines 56. The current detector 62 includes a current mirror circuit 100 and a current-to-voltage converting circuit (I-V converting circuit) 102.

As shown in FIG. 5, the current mirror circuit 100 comprises an input device (also called "sourcing device") 104 as a diode-connected MOSFET, and an output device (also called "mirroring device") 106 as a source-grounded MOSFET. The input device 104 and the output device 106 include respective source electrodes S connected in common to the bias power supply 64 as a DC power supply for applying the bias voltage (voltage value) Vbias.

The input device 104 has a current detecting end for detecting an input current I1 at the juncture between a drain electrode D and a gate electrode G thereof. The photoelectric conversion element 48 is connected to the current detecting end of the input device 104 through the common line 58 and the bias line 56. The output device 106 has a drain electrode D serving as a current output end for outputting an output current (detected current) I2. The I-V converting circuit 102 is connected to the current output end of the output device 106.

The I-V converting circuit 102 comprises an operational amplifier 108 and a resistor 110 having a resistance value R.

If the input device 104 and the output device 106 are fabricated in the same process, then a bias current I1 as the input current supplied to the current mirror circuit 100 is basically the same as the output current I2 (I1=I2).

A voltage value calculated by multiplying the output current I2 by the resistance value R of the resistor 110 of the I-V converting circuit 102 is obtained as a voltage value V (V=I2× R) of an input voltage applied to an A-D converter 116 connected to the output terminal of the current detector 62. The A-D converter 116 produces digital data of the voltage value V which corresponds to the bias current I1, which are read by a controller 66. If the bias current I1 flows into the current detector 62, the controller 66 can immediately read the bias current I1 (I1=I2=V/R).

Figure 6A:
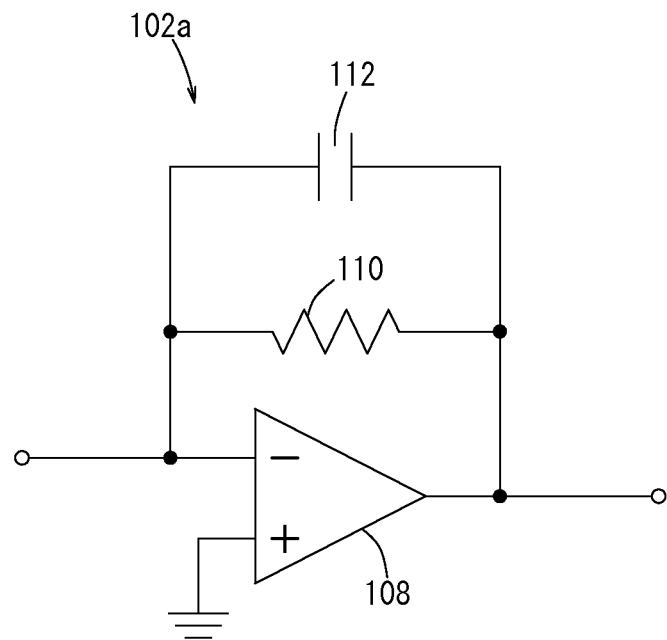
FIG. 6A is a circuit diagram of an I-V converting circuit with a noise filtering function.
Figure 6B:
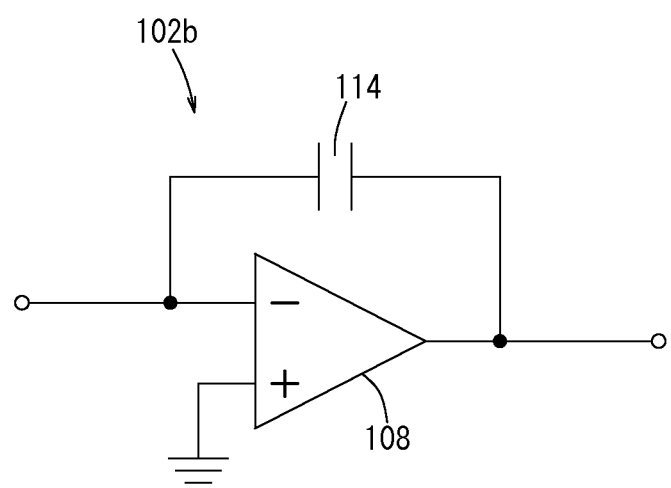
FIG. 6B is a circuit diagram of an I-V converting circuit in the form of a charge amplifier.

As shown in FIG. 6A, the I-V converting circuit 102 may be modified into an I-V converting circuit 102a with a noise filtering function provided by a capacitor 112 connected in parallel to the resistor 110. Alternatively, as shown in FIG. 6B, the I-V converting circuit 102 may be modified into an I-V converting circuit 102b in the form of a charge amplifier with a capacitor 114 connected in parallel to the operational amplifier 108.

If the current mirror circuit 100 includes MOSFETs as shown in FIG. 5, then the gate-to-source voltage Vgs of the input device 104, which is equal to the gate-to-drain voltage Vds thereof, is basically of a value Vgs under which an input current I1 expressed by the following equation (1) flows, and an output current I2 expressed by the following equation (2) flows into the output device 106 under the value Vgs:

$$I1 = (1/2) \cdot \mu1 \cdot Cox1 \cdot (W1/L1) \cdot (Vgs - Vth1) \quad (1)$$

$$I2 = (1/2) \cdot \mu2 \cdot Cox2 \cdot (W2/L2) \cdot (Vgs - Vth2) \quad (2)$$

where $\mu1$, $\mu2$ represent mobilities, Cox1, Cox2 the capacitances of insulating films per unit area, W1, W2 channel widths, L1, L2 channel lengths, and Vth1, Vth2 threshold voltages. The suffix "1" indicates the physical quantities of the input device 104, and the suffix "2" indicates the physical quantities of the output device 106.

If the MOSFETs of the input device 104 and the output device 106 are fabricated in the same process, then the above physical properties are related according to the following equations (3):

$$\mu1 = \mu2, Cox1 = Cox2, Vth1 = Vth2 \quad (3)$$

It can be understood that the input current I1 and the output current I2 are related to each other according to the following equation (4):

$$I2/I1 = (W2/L2)/(W1/L1) \quad (4)$$

Consequently, if the MOSFETs are fabricated in the same pattern with (W2/L2)=(W1/L1), then the input current I1 and the output current I2 are equal to each other.

Figure 7:
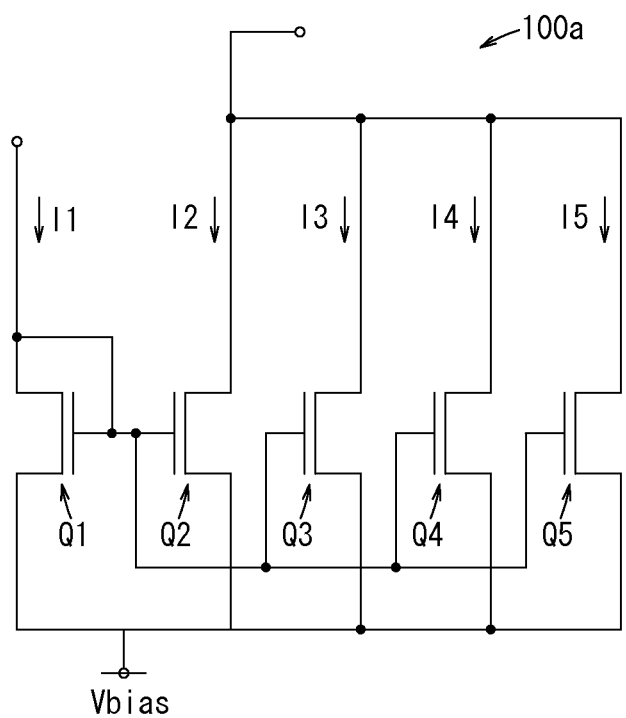
FIG. 7 is a circuit diagram of a multistage current mirror circuit.

As shown in FIG. 7, if the current mirror circuit 100 is modified into a multistage current mirror circuit 100a including an input device Q1 and a plurality of output devices Q2, Q3, Q4, Q5 connected in parallel to the input device Q1, then an input current I1 flowing into the input device Q1 is expressed as I1=I2+I3+I4+I5=4×I1 where I2, I3, I4, I5 represent currents flowing into the output devices Q2, Q3, Q4, Q5, respectively. Therefore, the multistage current mirror circuit 100a can produce an output current which is a multiple (the number of the parallel connected devices) of the input current I1. Thus, an increased detection sensitivity and a large signal-to-noise ratio are achieved for higher noise resistance.

If the MOSFETs are fabricated in a pattern with (W2/L2)>(W1/L1), then the output current I2 can be greater than the input current I1, i.e., the bias current I1 flowing in the photoelectric conversion element 48. Thus, the detection sensitivity is increased and the signal-to-noise ratio is increased for higher noise resistance. In this case, in order to increase the symmetry in the circuit arrangement, preferably the channel lengths should be the same (L2=L1), while the channel widths are not the same (W2>W1), so that the MOSFETs are fabricated in a pattern with (W2/L2)>(W1/L1).

If the difference between the drain-to-source voltage Vds of the input device 104 and the drain-to-source voltage Vds of the output device 106 of the current mirror circuit 100 shown in FIG. 5 is large, then an error occurs between the input current I1 and the output current I2 depending on the difference.

Figure 8:
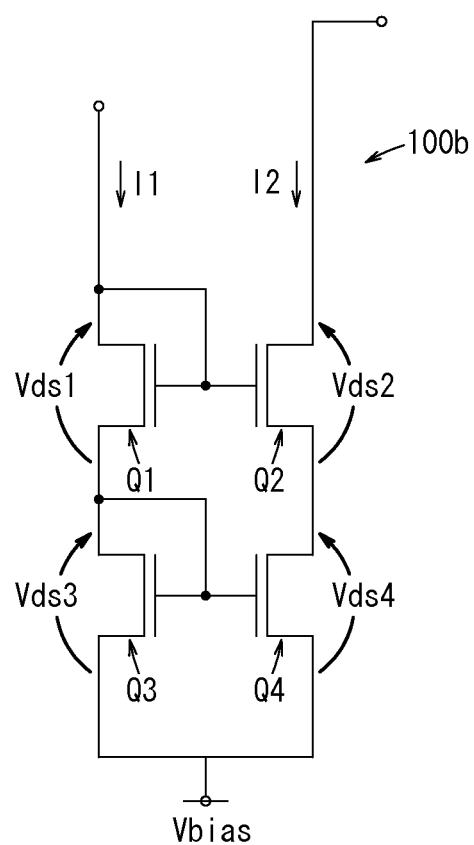
FIG. 8 is a circuit diagram of a cascode current mirror circuit.

For reducing the error, a cascode current mirror circuit 100b shown in FIG. 8 may be employed. The cascode current mirror circuit 100b is made up of MOSFETs Q1, Q2, Q3, Q4 wherein the drain-to-source voltage Vds3 of the MOSFET Q3 is equal to the drain-to-source voltage Vds4 of the MOSFET Q4, i.e., the gate-to-source voltage Vgs1 of the MOSFET Q3 is equal to the gate-to-source voltage Vgs2 of the MOSFET Q4, so that the difference between the input current I1 and the output current I2 can be reduced.

Figure 9:
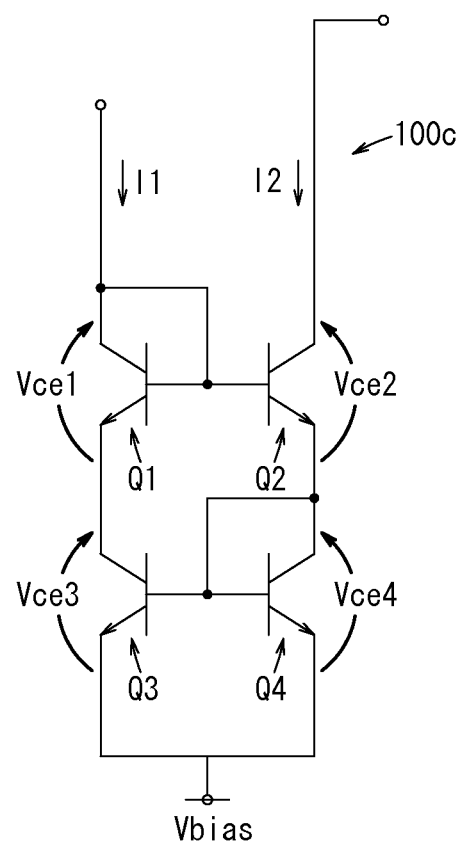
FIG. 9 is a circuit diagram of a Wilson current mirror circuit.

FIG. 9 shows a Wilson current mirror circuit 100c using bipolar transistors Q1, Q2, Q3, Q4. The transistors Q3, Q4 have respective collector-to-emitter voltages Vce3, Vce4 equal to each other for reducing temperature drifts.

The current mirror circuits 100, 100a, 100b can be reduced in cost if they are integrally formed with the TFTs 54 on the substrate 46 with the photoelectric conversion elements 48 fabricated thereon.

If the current mirror circuits 100, 100a, 100b, 100c are not integrally formed with the TFTs 54, but formed as an integrated circuit on a silicon chip, then since the resistance values of the devices are further reduced, changes in the bias voltage due to changes in the bias current I1 or the like can be reduced.

In a case where the current mirror circuits 100, 100a, 100b, 100c are formed as an integrated circuit, the current mirror circuits 100, 100a, 100b, 100c and the I-V converting circuits 102, 102a, 102b connected thereto may be formed as a single integrated circuit for a reduced cost and a reduced packaging area.

Incidentally, the current mirror circuits 100, 100a, 100b and the I-V converting circuits 102, 102a, 102b may be integrally formed with the TFTs 54 on the substrate 46.

In FIGS. 4 and 5, the controller 66 comprises a calculator including a micro computer. More specifically, the controller 66 includes a CPU (central processing unit); a memory 66m serving as a storage unit such as ROM (including EEPROM), RAM (random access memory), etc.; an input/output device such as an A-D converter, a D-A converter, etc.; a timer for timing; and the like. The CPU reads out and executes a program stored in the ROM, whereby the controller 66 can serve as various functions such as a controlling unit, a calculating unit, a correcting unit, a processing unit, etc.

As shown in FIGS. 4 and 5, the cathode electrodes of the photoelectric conversion elements 48 are connected to the respective source electrodes S of the TFTs 54, while the gate electrodes G of the TFTs 54 are connected to the corresponding gate lines 50 extending from the gate drive circuit (scanning drive circuit) 65. Also, the drain electrodes D of the TFTs 54 are connected to the corresponding signal lines 52.

Then, the gate drive circuit 65 applies a voltage for signal-readout, to the gate electrodes G of the TFTs 54 through the gate line 50 thereby to open the gates of the TFTs 54, and then electric charges stored in the photoelectric conversion elements 48, i.e., electric signals, are read out from the drain electrodes D to the signal lines 52 through the source electrodes S of the TFTs 54.

The signal lines 52 are connected to a signal reading circuit 68, more specifically to respective amplifying circuits 70 in the signal reading circuit 68.

In the present embodiment, each of the amplifying circuits 70 comprises a charge amplifying circuit as shown in FIG. 5. More specifically, the amplifying circuit 70 includes an operational amplifier 70a, a variable capacitor (capacitance-value varying unit) 70b connected in parallel to the operational amplifier 70a, and a charge-reset switch SW1 for resetting electric charges and which is connected in parallel to the variable capacitor 70b. The capacitance value of the variable capacitor 70b is set by the controller 66.

Instead of the variable capacitor 70b, for example, the following structure may be adopted. That is, series circuits each having a fixed capacitor and a switch is connected in parallel to each other, so as to select the switches (for example, see FIG. 7 of JP2009-219538A).

If the gate of the TFT 54 in the photoelectric conversion element 48 is opened (i.e., the voltage for signal-readout is applied to the gate electrode G of the TFT 54) under a condition where the charge-reset switch SW1 is turned off, the variable capacitor 70b accumulates therein electric charges read out from the photoelectric conversion element 48. Then, a voltage value V output from the operational amplifier 70a increases depending on the accumulated amount of the electric charges.

The charge-reset switch SW1 is turned on, and then the input of the amplifying circuit 70 and the output thereof are short-circuited thereby to discharge the electric charges accumulated in the variable capacitor 70b.

In the present embodiment, the controller 66 has a table wherein the ranges of the voltage value V (see FIG. 5) output from the current detector 62 are associated with setting values of the variable capacitor 70b, whereby the gain of the amplifying circuit 70 can be set (the capacitance value of the variable capacitor 70b can be set).

Further, the controller 66 applies a charge reset signal to the charge-reset switch SW1, and thus controls ON and OFF of the charge-reset switch SW1.

Incidentally, the capacitance setting value of the variable capacitor 70b in the amplifying circuit 70 is appropriately set based on performances or the like required for the electronic cassette 20. In the present embodiment, the charge-reset switch SW1 comprises an FET.

To the output terminal of the amplifying circuit 70, a correlated double sampling (hereinafter referred to as CDS) circuit 80 is connected. In the CDS circuit 80, CDS is performed as follows.

Before the gate of the TFT 54 in each photoelectric conversion element 48 is opened for signal-readout, the charge-reset switch SW1 is turned on to reset electric charges accumulated in each capacitor. Thereafter, the charge-reset switch SW1 is turned off into a stand-by state for signal-readout. In the state, the CDS circuit 80 first holds a voltage value (noise component) output from the output terminal of the amplifying circuit 70 at this stage due to a dark current or the like.

Then, the gate of the TFT 54 in each photoelectric conversion element 48 is opened, and electric signals are read out from the photoelectric conversion elements 48 and accumulated as electric charges in each of the selected capacitors. Thereafter, the gate of the TFT 54 is closed, and the CDS circuit 80 holds a voltage value (noise component+signal component) output from the output terminal of the amplifying circuit 70. The CDS circuit 80 calculates the difference between the above two voltage values, and eliminates the noise component based on the calculated difference. Then, the CDS circuit 80 outputs the analogue value (signal component) of the electric signals derived from the photoelectric conversion element 48. Thus, the CDS circuit 80 reduces the noise generated at the time of resetting of the capacitors.

The electric signals output from the CDS circuit 80 are sequentially delivered to the A-D converter 84 through a multiplexer 82 (see FIG. 4), and converted into digital values by the A-D converter 84. The A-D converter 84 sequentially outputs the electric signal, which is the above converted digital value, of each photoelectric conversion element 48 to the controller 66.

The controller 66 controls ON/OFF of the bias power supply 64 for supplying a reverse bias voltage to the photoelectric conversion elements 48, and also controls other units including unillustrated other devices and circuits, although illustration thereof is omitted in FIGS. 4 and 5. Further, a communication unit 76 is connected to the controller 66 in order to perform communication with a system controller 24.

Figure 10:
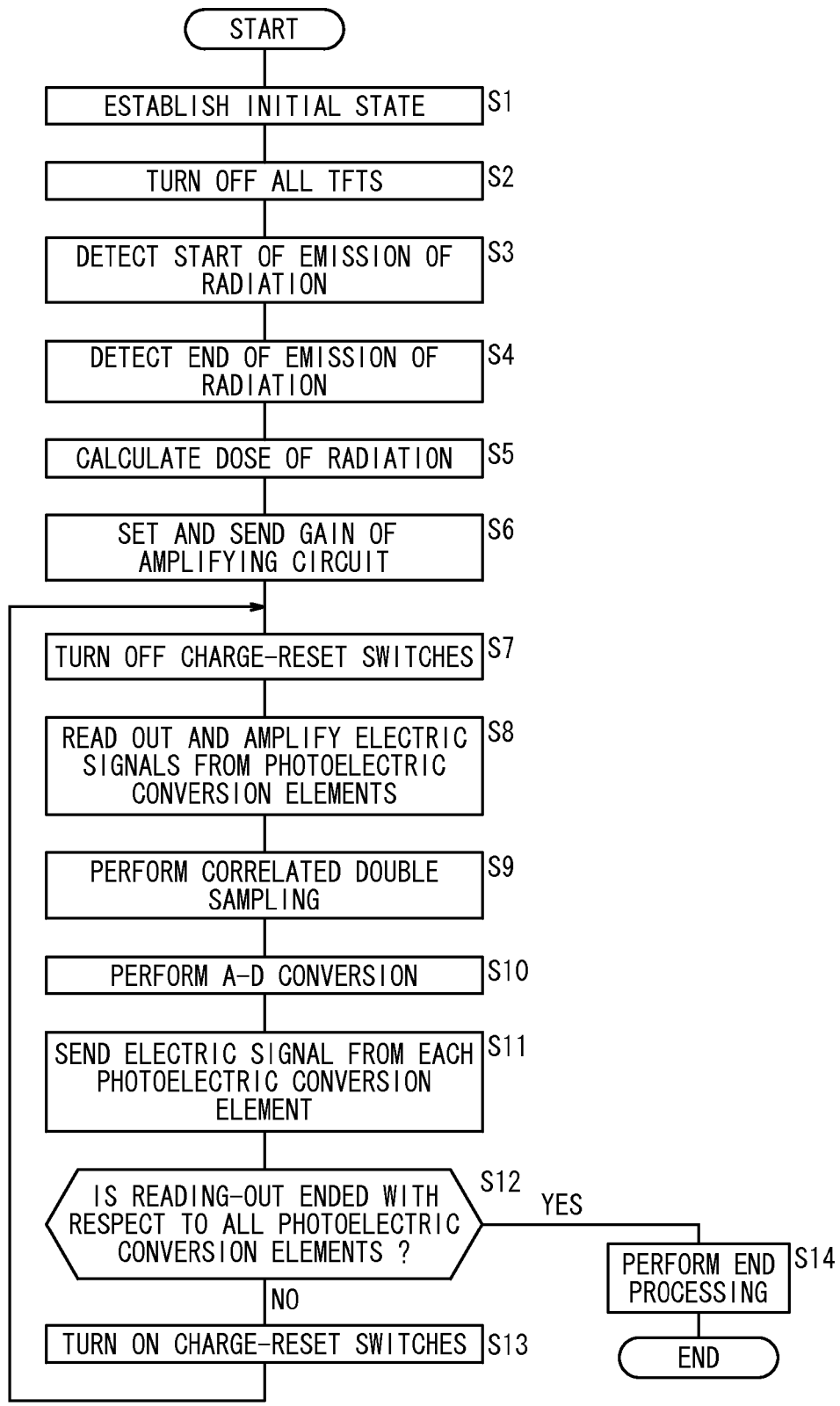
FIG. 10 is a flowchart of an operation sequence of a controller of the radiographic image detecting apparatus according to the embodiment.

Next, operation of the radiographic image capturing system 10, which is basically constructed as above, will be described below, and also an operational sequence for control by the controller 66 will be described below with reference to the flowchart shown in FIG. 10. Together therewith, operation of the electronic cassette 20 according to the embodiment of the present invention will be described below.

First, the console 26 judges whether or not an image-capturing region and a diagnosing region have been selected by operation of an unillustrated input unit by the user. In this case, the system controller 24 displays an image for selection of the image-capturing region and diagnosing region, on the display device 28. The user can select an image-capturing region and a diagnosing region of a patient (subject 14) to be imaged from now, while the user watches the displayed image.

If the console 26 judges that the image-capturing region and the diagnosing region have been selected by the user, then the system controller 24 reads out image-capturing conditions depending on the selected image-capturing region and diagnosing region, from the table of its own database, and establishes the read image-capturing conditions as image-capturing conditions for a radiographic image capturing process to be performed from now. Incidentally, the system controller 24 may display the established image-capturing conditions on the display device 28. In this case, the user can visually confirm contents of the established image-capturing conditions.

In order to emit radiation 16 from the radiation source 34 under the established image-capturing conditions, the user operates the unillustrated input unit provided on the radiation source controller 36 thereby to set the same image-capturing conditions as the image-capturing conditions established in the system controller 24, in the radiation source controller 36. For example, by providing the radiation apparatus 18 with the same table, the user may select the image-capturing region and diagnosing region so as to set the same image-capturing conditions. Alternatively, the user may directly input the tube voltage, the irradiation time, the tube current, mAs value, etc.

Thereafter, the system controller 24 transmits an activation signal to the communication unit 76 of the electronic cassette 20 through its own communication unit (not shown), to activate the electronic cassette 20.

Prior to emission of radiation 16 from the radiation apparatus 18, the controller 66 of the electronic cassette 20 turns on the charge-reset switches SW1 of all the amplifying circuits 70. Also, the controller 66 controls the gate drive circuit 65 to apply voltage for signal-readout, to the gate electrodes G of the TFTs 54 in all the photoelectric conversion elements 48, through the gate lines 50, whereby all the TFTs 54 are brought into an ON state.

Thus, unnecessary electric charges accumulated in the photoelectric conversion elements 48, the signal lines 52, the variable capacitors 70b, the bias lines 56, the current detector 62, etc. are discharged and eliminated, whereby an initial state is established (step S1).

Next, the controller 66 stops application of the voltage for signal-readout to the gate electrodes G of the TFTs 54 in all the photoelectric conversion elements 48 thereby to bring all the TFTs 54 into an OFF state (step S2).

In this state, the controller 66 monitors the state of the current detector 62 based on the output value of the A-D converter 116, and detects start of emission of the radiation 16 based on pushing-down of the radiation switch 38 by the user (step S3). Then, the controller 66 detects end of emission of the radiation 16 according to the irradiation time predetermined depending on the image-capturing region and diagnosing region (step S4). During the period from the start of emission of the radiation 16 until the end of emission of the radiation 16, the radiographic image capturing process is performed with respect to the subject 14.

Incidentally, information or signals about the start of emission of the radiation 16 and the end of emission thereof may be acquired and used from the radiation source 34 for applying the radiation 16 to the electronic cassette 20 through the subject 14 such as a human body or from the radiation source controller 36 for controlling the radiation source 34. Even in such a case, the present invention is applicable to the radiographic image detecting apparatus and the radiographic image capturing system incorporating the same.

In the present embodiment, by using information of bias current (current value) I1 from the current detector 62, which is used for gain adjustment (to be described later) of the amplifying circuit 70, the electronic cassette 20 detects the start of emission of the radiation 16 and the end of emission of the radiation 16 by itself. Next, detection of the start and end of emission of the radiation 16, and the gain adjustment of the amplifying circuit 70 will be described below.

In the present embodiment, if a reverse bias voltage, i.e., a negative voltage, is applied to the anode electrodes of the photoelectric conversion elements 48 as shown in FIG. 4 through the bias lines 56, then a potential gradient is generated in the photoelectric conversion element 48. In this state, radiation 16 is emitted from the radiation source 34. The scintillator 44 receives the emitted radiation 16, and converts the radiation 16 into electromagnetic wave. The converted electromagnetic wave is applied to the photoelectric conversion elements 48, and then electron-hole pairs are generated in the photoelectric conversion elements 48.

Of the generated electron-hole pairs, electrons move toward each cathode electrode having a high potential, according to the potential gradient. However, since each gate of the TFT 54 is closed, the electrons are accumulated near the cathode electrode. Thus, each photoelectric conversion element 48 accumulates the amount of electrons depending on the applied amount of electromagnetic wave.

On the other hand, of the generated electron-hole pairs, holes move toward each anode electrode having a low potential according to the potential gradient, and then move through each anode electrode into the corresponding bias line 56. As shown in FIGS. 4 and 5, the holes flowing from the photoelectric conversion elements 48 through the bias lines 56 are detected as an electric current by the current detector 62.

That is, the holes flow in the bias lines 56 at the same amount as that of the electrons accumulated in the photoelectric conversion elements 48 depending on the applied amount of electromagnetic wave. The currents flowing in the bias lines 56 are converged into the common line 58, and the converged current flows toward the current detector 62 through the common line 58.

In a stage before application of radiation, i.e., in a stage where no radiation 16 or electromagnetic wave enters the photoelectric conversion elements 48, ideally, no current flows in the bias lines 56 or the common line 58, but actually, a dark current is generated in the photoelectric conversion elements 48, and weak electric current is detected by the current detector 62.

Figure 11:
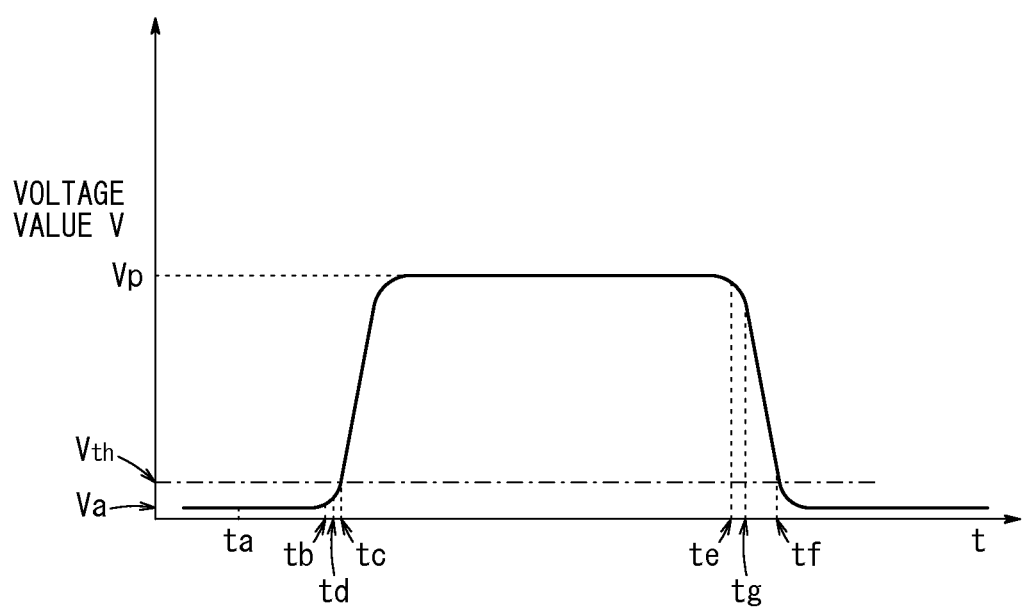
FIG. 11 is a graph showing by way of example the manner in which a voltage converted from a current by a current detector and output therefrom changes with time.

As described above, in the present embodiment, since the current detector 62 converts electric current flowing in the common line 58 into voltage value V by use of the I-V converting circuit 102 and outputs the voltage value V, even in the stage before application of radiation where no radiation 16 or electromagnetic wave enters the photoelectric conversion elements 48, as shown in FIG. 11 at time point ta, a voltage value Va, which is weak but not zero, is input from the current detector 62 to the controller 66.

The radiation source 34 starts to emit radiation 16. Then, electron-hole pairs are generated in each photoelectric conversion element 48, and holes move to the current detector 62 through the bias lines 56 and the common line 58. Thus, at time point tb as shown in FIG. 11, the voltage value V output from the current detector 62 increases. In the present embodiment, the controller 66 detects that the voltage value V output from the current detector 62 starts to increase, whereby the controller 66 detects the start of emission of the radiation 16 (step S3).

The current detector 62 may detect that the voltage value V exceeds a predetermined threshold value Vth. In this case, the current detector 62 detects that emission of radiation 16 is started at time point tc as shown in FIG. 11. Alternatively, the current detector 62 may detect that the temporal differentiation value of the voltage value V exceeds a predetermined threshold value. In this case, the current detector 62 detects that emission of radiation 16 is started at time point td as shown in FIG. 11.

The emission of the radiation 16 from the radiation source 34 is completed, whereupon generation of electron-hole pairs is stopped in each photoelectric conversion element 48, and then supply of holes to the bias lines 56 is also stopped. As a result, at time point to as shown in FIG. 11, the voltage value V output from the current detector 62 starts to decrease. In the present embodiment, the controller 66 detects that the voltage value V output from the current detector 62 decreases, whereby the controller 66 detects the end of emission of radiation 16 (step S4).

The current detector 62 may detect that the voltage value V falls below a predetermined threshold value Vth. In this case, the current detector 62 detects that emission of radiation 16 is ended at time point tf as shown in FIG. 11. Alternatively, the current detector 62 may detect that the temporal differentiation value of the voltage value V falls below a predetermined negative threshold value. In this case, the current detector 62 detects that emission of radiation 16 is ended at time point tg as shown in FIG. 11. In the present embodiment, time point tc is regarded as the start point of emission of radiation 16, time point tf is regarded as the end point of emission of the radiation 16.

As described above, electron-hole pairs are generated in proportion to the number of photons of radiation 16 or electromagnetic wave applied to the photoelectric conversion elements 48, and holes flow from the photoelectric conversion elements 48 into the bias lines 56 depending on the applied amount of electromagnetic wave. Thus, by measuring the total amount of current flowing through the common line 58, it is possible to determine the dose of the radiation 16 applied to the electronic cassette 20 from the start of emission of the radiation 16 until the end of emission of the radiation 16.

In the present embodiment, in order to determine the dose of the radiation 16 more easily, the controller 66 includes a peak-hold function. Thus, the controller 66 determines the dose of the applied radiation 16 based on the time interval tf–tc between the start and end of emission of the radiation 16, and the peak value of current flowing through the common line 58 detected by the current detector 62 (step S5).

More specifically, the controller 66 detects the peak value Vp of the voltage value detected between the start point tc of emission and the end point tf of emission. Then, the controller 66 calculates an approximate value M of the dose of the radiation 16 applied to the electronic cassette 20 according to the equation (5), i.e., based on a value obtained by multiplying the peak value Vp by a value obtained by subtracting a constant α from the time interval tf−tc between start and end of emission of the radiation 16. In the equation (5), "a" is a constant.

$$M = a \times Vp \times (tf - tc - \alpha) \quad (5)$$

In the determination of the approximate value M, the voltage value V from the rising edge after the start point tc of emission until the falling edge before the end point tf of emission in FIG. 11 is regarded as a rectangular shape, and then the approximate value M of the dose of the radiation 16 is determined as a value proportion to the area of the rectangular shape. Thus, advantageously, it is possible to easily calculate the dose of the radiation 16 simply by detecting the start point tc and the end point tf, and the peak value Vp.

Incidentally, by using an integrating circuit or the like, the integral value of the voltage value V (or a value obtained by subtracting a constant value corresponding to noise from the voltage value V) from the start point tc of emission until the end point tf of emission as shown in FIG. 11 may be calculated thereby to determine the dose of the radiation 16 applied to the electronic cassette 20. In this case, it is possible to calculate the dose of the radiation 16 more precisely.

Also, in order to eliminate the noise component more accurately, the integrating circuit or the like may be equipped with a bandpass filter, which passes data having frequencies within a certain range and rejects (attenuates) data having frequencies outside the certain range. In this case, the voltage value corresponding to the current value output from the current detector 62 can be subjected to a bandpass filtering process and integrated, thereby to determine the dose of the radiation 16.

Next, the controller 66 sets the gain of the amplifying circuit 70 at the time of reading of the electric signals from the photoelectric conversion elements 48 based on the calculated dose (or the approximate value M) of the radiation 16 (step S6).

In the present embodiment, the controller 66 contains, in the memory 66m, a table where the thus-calculated dose of the radiation 16 is associated with the gain of the amplifying circuit 70, i.e., the total value of the capacitance of the variable capacitor 70b in the amplifying circuit 70. For example, the capacitance is set in the range from 0.5 [pF] to 4 [pF] in increments of 0.5 pF (i.e., 8 steps).

Thus, in the table, the dose of the radiation 16 is divided into eight steps depending on its magnitude, and a certain capacitance value of the variable capacitor 70b is associated with each step. In the table, as the dose of the radiation 16 is larger, the set gain of the amplifying circuit 70 is lower.

The controller 66 determines the dose of the radiation 16, and then adjusts the gain of the amplifying circuit 70 with reference to the table.

The controller 66 sends information of the above-set gain of the amplifying circuit 70 to the system controller 24 through the communication unit 76 (see FIG. 4) (step S6).

Next, the controller 66 turns off the charge-reset switch SW1 of each amplifying circuit 70 (step S7), and then sends a signal to the CDS circuit 80. The CDS circuit 80, which has received the signal, holds the voltage value Vin output from the amplifying circuit 70 at this stage, as shown in FIG. 12.

Then, the controller 66 controls the gate drive circuit 65 (see FIG. 4) to apply the voltage for signal-readout, to one of the gate lines 50, thereby to open the gates of TFTs 54 whose gate electrodes G are connected to the one gate line 50. Then, electric charges (electrons in the present embodiment) accumulated in photoelectric conversion elements 48 that are connected to the above TFTs 54 are read out as electric signals into the signal lines 52, and the electric signals are amplified by the amplifying circuits 70 where the gains are set in the above manner (step S8).

Subsequently, after electric charges are accumulated in the variable capacitor 70b of each amplifying circuit 70, the controller 66 outputs, to the gate drive circuit 65, a signal for applying a voltage for non-readout of signal (i.e., for holding the signal) to the gate line 50, thereby to close the gate of each TFT 54. The above signal is also sent to the CDS circuit 80. The CDS circuit 80, which has received the signal, holds the voltage value Vout output from the amplifying circuit 70 at this stage, as shown in FIG. 12. Then, the CDS circuit 80 calculates the difference between Vout and Vin (Vout−Vin) (correlated double sampling process), and outputs the calculated difference (step S9).

The electric signal, i.e., the difference Vout−Vin, output from each CDS circuit 80 is sequentially sent to the A-D converter 84 through the multiplexer 82 (see FIG. 4), that is, the electric signal for each photoelectric conversion element 48 is sent to the A-D converter 84, and then sequentially converted into a digital value by the A-D converter 84 (step S10).

The A-D converter 84 sends the electric signal of each photoelectric conversion element 48, and then the controller 66 sequentially sends the electric signal to the system controller 24 through the communication unit 76 (step S11). At this time, the electric signal from each photoelectric conversion element 48 may be stored in the memory 66m disposed in or connected to the electronic cassette 20. Also, all data may be stored in the memory 66m and sent in a lump at the time of an ending process.

Next, if reading of electric signals is not ended with respect to all the photoelectric conversion elements 48 (step S12; NO), then the controller 66 turns on the charge-reset switch SW1 of each amplifying circuit 70 (step S13), thereby to discharge and eliminate the electric charges accumulated in the variable capacitor 70b of each amplifying circuit 70. Thereafter, the controller 66 turns off the charge-reset switch SW1 of each amplifying circuit 70, and then the processes from step S7 are repeated with respect to another gate line 50 through which the voltage for signal-readout is applied from the gate drive circuit 65.

If application of the voltage for signal-readout is ended with respect to all the gate lines 50 and readout of electric signals is ended with respect to all the photoelectric conversion elements 48 (step S12; YES), then the controller 66 performs necessary processes such as a process for discharging remaining electric charges in each photoelectric conversion element 48, each amplifying circuit 70, etc. (step S14), and puts an end to the processes.

[Radiographic Image Capturing System]

As shown in FIGS. 1 and 4, the radiographic image capturing system 10 according to the present embodiment comprises the above electronic cassette 20, and the system controller 24.

Radiographic image capturing process by use of the electronic cassette 20 has been completed, and then the gain of the amplifying circuit 70 is set. Electric signals are read out from the photoelectric conversion elements 48, and information of each electric signal is sequentially sent through the communication unit 76. The information is input to the system controller 24.

The system controller 24 performs necessary image processing on the received information of the electric signals, and arranges the information of the electric signals in accordance with the arrangement of the photoelectric conversion elements 48 in the electronic cassette 20, thereby to produce a radiographic image. In accordance with operation input through the console 26, the obtained radiographic image is displayed on the display device 28, or the radiographic image is recorded in an image recording medium such as a film, etc. by an unillustrated imager, for example.

As described above, in the electronic cassette 20 according to the present embodiment, radiation 16 or electromagnetic wave converted from the radiation 16 is applied to the photoelectric conversion elements 48, whereupon electron-hole pairs are generated in the photoelectric conversion elements 48. Of the generated electron-hole pairs, one type of electric charges are accumulated in the photoelectric conversion elements 48, while the other type of electric charges flow in the bias lines 56. In this case, the electric charges flow out from the photoelectric conversion elements 48 at the amount corresponding to the applied amount of radiation 16 or electromagnetic wave.

Thus, by measuring the electric current due to the electric charges flowing into the bias lines 56, it is possible to determine the actual dose of the radiation 16 applied to the electronic cassette 20 exactly. Based on the exactly-determined dose of the radiation 16, the gain of each amplifying circuit 70 can be set appropriately.

Also, it is not necessary to perform pre-readout of electric signals such as a nondestructive readout. Since at the same time of application of radiation 16, the dose thereof is detected thereby to set the gain of each amplifying circuit 70, it is possible to start reading of electric signals immediately after the application of the radiation 16. Thus, it is possible to prevent increase in noise due to dark current or the like which increases with time, and then decrease in signal-to-noise ratio can be avoided.

Further, it is not necessary to perform pre-readout of electric signals such as a nondestructive readout. Since radiographic image capturing process can be started immediately, wasteful consumption of electricity due to pre-reading of electric signals can be prevented.

Also, since end of emission of radiation 16 is detected based on decrease in electric current detected by the current detector 62, even if information of the end of emission of the radiation 16 is not input externally, the electronic cassette 20 can detect the end of emission of the radiation 16 by itself, and start reading of electric signals immediately after the application of the radiation 16.

With the radiographic image capturing system 10 according to the present embodiment, as described above, in the electronic cassette 20, it does not take long to start image-capturing process, and reading of electric signals is started immediately after the completion of the image capturing process, whereby decrease in signal-to-noise ratio is prevented. Also, since the obtained electric signals are amplified under a condition where the gain of each amplifying circuit 70 is appropriately set, noise is reduced and dynamic range is secured. Thus, it is possible to obtain a suitable radiographic image having a high image quality.

Further, in the electronic cassette 20, the amplifying circuit 70 comprises an operational amplifier 70a and a variable capacitor 70b connected in parallel to the operational amplifier 70a, and the gain of the amplifying circuit 70 is set, and thus the gain of the amplifying circuit 70 can be set easily and appropriately.

Further, since the gain of each amplifying circuit 70 is easily set, it is possible to set the gain of each amplifying circuit 70 immediately after the completion of radiographic image capturing.

Also, the CDS circuit 80 eliminates noise component according to correlated double sampling technique. Thus, noise such as thermal noise, etc. of at least the capacitor of each amplifying circuit 70 can be eliminated appropriately, and thus signal-to-noise ratio of the obtained radiographic image can be enhanced.

Also, since the start of emission of radiation 16 and the end of emission of radiation 16 are detected based on increase and decrease in the electric current flowing through the bias lines 56, even if the radiographic image detecting apparatus does not acquire information about the start of emission and the end of emission from the radiation source or the like, the start and end of emission of radiation 16 can be detected exactly, and the dose of the applied radiation 16 can be detected exactly.

In particular, since the current mirror circuit 100 is used as the current detector 62 for detecting bias current I1, even if the bias current I1 varies, the voltage at an input side (diode-connection side) of the current mirror circuit 100 hardly changes. Thus, unlike JP2009-219538A, voltage drop does not occur during the application of the radiation 16, and a reverse bias voltage of the photoelectric conversion elements 48 is kept substantially constant. Therefore, advantageously, the photosensitivity does not vary.

[Other Embodiments]

FIG. 13 is a circuit diagram of a radiographic image capturing system 10A incorporating a radiographic image detecting apparatus 20A according to another embodiment of the present invention.

In the other embodiment, a detector section P is divided equally into a left area and a right area, i.e., a square area A and a square area B. The area A and the area B have the same number of signal lines 52 arranged thereon and the same number of photoelectric conversion elements 48 arranged thereon.

In the radiographic image capturing system 10A according to the other embodiment, radiographic image capturing process can be performed in three image-capturing modes, i.e., the first mode in which a radiographic image is captured only on the area A, the second mode in which a radiographic image is captured only on the area B, and the third mode in which a radiographic image is captured on both the area A and the area B (i.e., on the entire area of the detector section P).

Further, in the radiographic image capturing system 10A of the other embodiment, various different processes can be performed for each area on which a radiographic image has been captured.

Incidentally, the number of division of the detector section P (i.e., the number of areas of the detector section P) may be arbitrarily selected. For example, the detector section P may be divided into three areas, or four or more areas. Also, the manner of division of the detector section P, such as the dimension and shape of each area, may be arbitrarily selected. For example, the detector section P may be divided into areas having different dimensions, or into an upper area and a lower area.

Figure 14A:
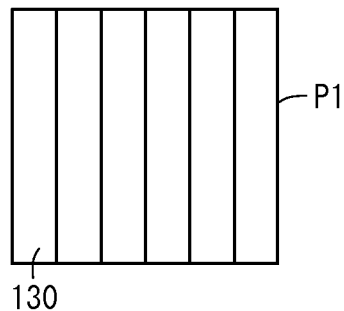
FIG. 14A is a view showing a detector section divided into vertical areas.

As described in FIG. 14A, in a case where a detector section P1 is divided into six vertical areas 130, it is convenient to perform a short-time measurement on a lower limb or the like.

Figure 14B:
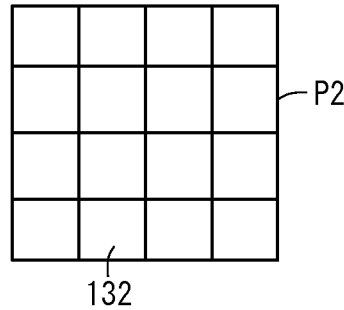
FIG. 14B is a view showing a detector section divided into a matrix of areas.

As described in FIG. 14B, in a case where a detector section P2 is divided into a matrix of areas 132, for example, it is convenient to perform a short-time measurement on an upper limb or the like including fingers.

Figure 14C:
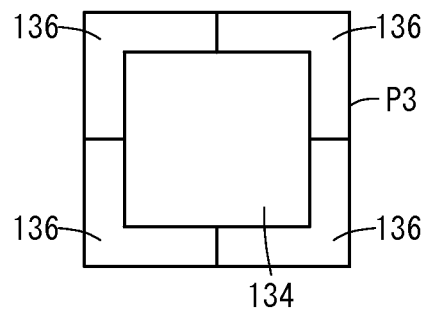
FIG. 14C is a view showing a detector section divided into a central area and four surrounding areas around the central area.

As described in FIG. 14C, in a case where a detector section P3 is divided into a rectangular central area 134 and four L-shaped areas 136 surrounding the central area 134, for example, it is convenient to perform a short-time measurement on a trunk or the like.

Figure 14D:
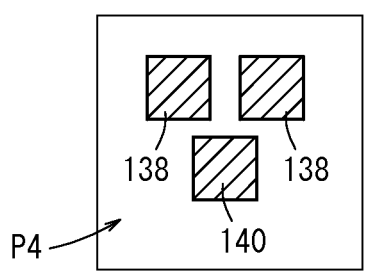
FIG. 14D is a view showing a detector section including only pulmonary areas and an abdominal area.

As described in FIG. 14D, in a case where, for example, a detector section P4 is divided into two pulmonary areas 138 corresponding to two lungs and an abdominal area 140 corresponding to an abdomen, it is convenient to perform a short-time measurement on the region of one lung of the two lungs, or an abdomen.

Figure 14E:
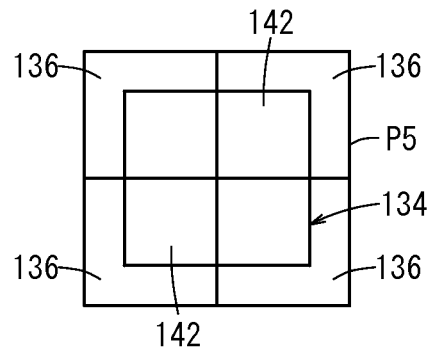
FIG. 14E is a view showing a detector section divided into four central areas and four surrounding areas around the central areas.

As described in FIG. 14E, a detector section P5 may be divided into a rectangular central area 134, which is further divided into four areas 142, and four L-shaped areas 136 surrounding the central area 134.

Also, on the surface 42a of the casing 42, which is irradiated with radiation 16, a distinguishing mark preferably should be disposed on the boundary between the area A and the area B, in order for the operator to distinguish the area A and the area B, although illustration thereof is omitted. Owing to the distinguishing mark provided on the casing 42, the operator can easily distinguish the area A and the area B for use as image-capturing regions, and thus perform positioning of the subject 14 and application of the radiation 16 appropriately.

In the detection section P of the substrate 46, the anode electrodes of photoelectric conversion elements 48 in the area A are connected to a common line (also referred to as a bias line or a common bias line) 92 through bias lines 88. The anode electrodes of photoelectric conversion elements 48 in the area B are connected to a common line (also referred to as a bias line or a common bias line) 94 through bias lines 90. The common lines 92, 94 are connected to a bias power supply 64.

The bias power supply 64 is connected to a controller 66. The controller 66 controls the bias power supply 64 to apply a reverse bias voltage to the photoelectric conversion elements 48 through the common lines 92, 94 and the bias lines 88, 90.

The common line 92 connected to the bias lines 88 is connected to a first current detector 62A, and the common line 94 connected to the bias lines 90 is connected to a second current detector 62B. Each of the first current detector 62A and the second current detector 62B is connected to the controller 66 through an A-D converter 116 and a judging unit 98. The A-D converters 116 and the judging unit 98 may be incorporated into the controller 66. In the following description, it is assumed that the A-D converters 116 and the judging unit 98 are incorporated into the controller 66. In this case, the judging unit 98 has a function to compare an output value from each A-D converter 116 with a threshold value (i.e., make a judgment) in order to judge whether or not radiation 16 has been applied to the areas A, B. The output from each A-D converter 116 is also directly supplied to the controller 66.

The judging unit 98 may comprise an analogue comparator (comparing circuit), so that the judging unit 98 can compare the output with the threshold without the use of the A-D converter 116. In this case, in order to avoid chattering caused by noise, a comparator with hysteresis preferably should be used as the analogue comparator.

The first current detector 62A detects an electric current flowing through the common line 92 connected to the bias lines 88. Independently of the first current detector 62A, the second current detector 62B detects an electric current flowing through the common line 94 connected to the bias lines 90.

More specifically, each of the first current detector 62A and the second current detector 62B comprises a current mirror circuit 100 and an I-V converting circuit 102, which are connected in series to the common line 92, 94. The current mirror circuit 100 detects the current flowing through the common line 92, 94, and the I-V converting circuit 102 converts the detected current into a voltage. Then, the voltage value V corresponding to the current value flowing through the common line 92, 94 is output to the controller 66.

In the following description, in a case where the first current detector 62A and the second current detector 62B are considered individually, they are referred to as "the first current detector 62A" and "the second current detector 62B", respectively. In a case where the first current detector 62A and the second current detector 62B are not required to be considered individually, they are referred to as "the current detector 62A, 62B" or "the current detector 62", collectively.

The cathode electrode of each photoelectric conversion element 48 in each area A, B is connected to the source electrode S of the corresponding TFT 54. The gate electrode G of each TFT 54 is connected to the corresponding one of the gate lines 50 extending from the gate drive circuit 65. The drain electrode D of each TFT 54 is connected to the corresponding one of the signal lines 52.

The controller 66 controls the gate drive circuit 65 to apply a voltage for signal-readout to the gate electrodes G of the TFTs 54 through the gate line 50, whereupon the gates of the TFTs 54 are opened, and then electric charges accumulated in the photoelectric conversion elements 48, i.e., electric signals, are read out from the drain electrodes D into the signal lines 52 through the source electrodes S of the TFTs 54.

The signal lines 52 are connected to corresponding reading circuits 68A, 68B.

The two reading circuits 68 are provided with respect to the two areas A, B, respectively. In the following description, the reading circuit 68A is associated with the area A, while the reading circuit 68B is associated with the area B. However, the number of reading circuits is not limited to the above, and each signal line 52 may be connected to one reading circuit.

In the following description, in a case where the reading circuits 68 are considered individually, they are referred to as "the reading circuits 68A, 68B". In a case where they are not required to be considered individually, they are referred to as "the reading circuits 68", collectively.

Each of the reading circuits 68 comprises amplifying circuits 70, CDS (correlated double sampling) circuits 80, a multiplexer 82, and an A-D converter 84. The reading circuit 68 reads out electric charges from each photoelectric conversion element 48 through the signal line 52, converts the read electric charges into a voltage, and amplifies the voltage. In this manner, the reading circuit 68 converts the electric charges into electric signals.

The amplifying circuit 70 and the CDS circuit 80 each are identical to those shown in FIG. 5, and thus explanation thereof is not made. If necessary, those will be explained with reference to FIG. 5.

The controller 66 controls the bias power supply 64, the first and second current detectors 62A, 62B, the gate drive circuit 65, the amplifying circuits 70 and the CDS circuits 80 in the reading circuits 68, etc., thereby to perform various processes for each of the areas A, B in a radiographic image capturing process.

More specifically, based on the voltage values output from the first current detector 62A and the second current detector 62B, the controller 66 (the judging unit 98 thereof) detects whether the emission of radiation 16 is started or not, for each area A, B, separately. If the controller 66 (the judging unit 98 thereof) detects that the emission of radiation 16 is started on any of the areas A, B, the reading circuit 68 associated with the area that has been irradiated with the radiation 16 reads out electric charges accumulated in the photoelectric conversion elements 48 in the area, and converts the read electric charges into electric signals, thereby to obtain image data. Further, the controller 66 produces thinned-out image data based on the image data read out from the area irradiated with the radiation 16, and sends the produced thinned-out image data and the original image data to the system controller 24 through the communication unit 76.

Next, a control sequence of the controller 66 will be described below with reference to a flowchart in FIG. 15, and also operation of the radiographic image capturing system 10A according to the other embodiment will be described below.

First, a process in which the controller 66 detects, for each area, whether the emission of radiation 16 is started or not will be described.

Prior to the application of radiation 16, the controller 66 turns on the charge-reset switches SW1 of all the amplifying circuits 70. Also, the controller 66 controls the gate drive circuit 65 to apply the voltage for signal-readout to the gate electrodes G of the TFTs 54 of all the photoelectric conversion elements 48 through the gate lines 50, thereby to turn on all the TFTs 54 (step S21).

In the above process, unnecessary electric charges accumulated in the photoelectric conversion elements 48, the signal lines 52, the variable capacitors 70b in the amplifying circuits 70, the bias lines 88, 90, etc. are discharged, whereby an initial state is established.

Next, the controller 66 stops the application of the voltage for signal-readout to the gate electrodes G of the TFTs 54 of all the photoelectric conversion elements 48 thereby to turn of all the TFTs 54 (step S22).

In this state, the controller 66 monitors the state of the first and second current detectors 62A, 62B, and detects, for each area A, B, whether the emission of radiation 16 is started or not (step S23).

In the radiographic image capturing process, radiation 16 is applied to the radiographic image capturing system 10A, and then passes through the subject 14 positioned on or near the irradiation surface 42a (see FIG. 1) of the radiographic image capturing system 10A. The radiation 16 enters the scintillator 44, which converts the radiation 16 into electromagnetic wave. The electromagnetic wave enters the photoelectric conversion elements 48 disposed below the scintillator 44.

In this case, the electromagnetic wave converted from the radiation 16 applied to the area A enters the photoelectric conversion elements 48 disposed in the area A, while the electromagnetic wave converted from the radiation 16 applied to the area B enters the photoelectric conversion elements 48 disposed in the area B.

In the photoelectric conversion elements 48 arranged in the areas irradiated with the radiation 16, electron-hole pairs are generated. Of the generated electron-hole pairs, one type of the electric charges move toward the anode electrodes, while the other type of the electric charges move toward the cathode electrodes, according to a potential gradient formed in the photoelectric conversion elements 48 by a reverse bias voltage applied from the bias power supply 64 through the bias lines 88, 90.

In this case, since off-voltage is applied to the gate electrodes G of the TFTs 54 so as to turn off the TFTs 54, the electrons moving toward the cathode electrodes in the photoelectric conversion elements 48 do not flow from the TFTs 54 into the signal lines 52, and thus are accumulated near the cathode electrodes.

On the other hand, the holes having the same amount as that of the electrons flow from the anode electrodes through the bias lines 88, 90 and the common lines 92, 94 to the current mirror circuits 100, which detect the flow of the holes.

Then, as explained with reference to FIG. 11, in the radiographic image capturing process, the emission of the radiation 16 is started, and then the electron-hole pairs are generated in the photoelectric conversion elements 48. Of the generated electron-hole pairs, the holes start flowing through the bias lines 88, 90, whereupon the electric currents flowing through the common lines 92, 94 start to increase. As a result, at time point tb as shown in FIG. 11, the voltage values V output from the current detectors 62A, 62B start to increase.

In this case, a certain threshold value Vth is predetermined for voltage value V output from each of the current detectors 62A, 62B respectively corresponding to the areas A, B. The controller 66 monitors whether or not the voltage value V output from the current detectors 62A, 62B exceeds the threshold value Vth, for each current detector 62A, 62B, independently.

For example, in a case where the radiation 16 is applied only to the area A, electron-hole pairs are generated in the photoelectric conversion elements 48 disposed in the area A irradiated with the radiation 16. Then, electric current flowing through the common line 92 of the bias lines 88 connected to the photoelectric conversion elements 48 in the irradiated area A starts to increase. As a result, the voltage value V output from the first current detector 62A associated with the area A increases and then exceeds the threshold value Vth. On the other hand, the voltage value V output from the second current detector 62B associated with the area B does not increase, and thus does not exceed the threshold value Vth.

If the voltage value V output from the first current detector 62A exceeds the threshold value Vth at time point tc, then the controller 66 judges that the emission of radiation 16 is started on the area A corresponding to the first current detector 62A at the time point tc. On the other hand, if the voltage value V output from the second current detector 62B does not exceed the threshold value Vth, the controller 66 judges that the radiation 16 is not applied to the area B corresponding to the second current detector 62B.

As described above, in the radiographic image capturing system 10A, the controller 66 monitors the voltage value output from the first current detector 62A corresponding to the area A and the voltage value output from the second current detector 62B corresponding to the area B, separately, and the controller 66 judges, for each area A, B independently, whether or not each of the voltage values output from the current detectors 62A, 62B exceeds the threshold value Vth. Thus, the controller 66 detects the start of emission of the radiation 16 for each area.

Subsequently, the controller 66 judges that the emission of the radiation 16 is ended after the elapse of a certain period of time from the time point tc at which the start of emission of the radiation is detected (step S24).

Incidentally, if the emission of the radiation 16 is stopped to end the radiographic image capturing process, no electron-hole pairs are generated in the photoelectric conversion elements 48, and then the voltage value V starts to decrease. As a result, the voltage value V output from the current detector 62 falls below the threshold value Vth at time point tf, for example. Therefore, in this case, the controller 66 may judge that the emission of the radiation 16 is ended at the time point tf on the area corresponding to the current detector 62.

Also, in order to detect the start and end of emission of the radiation 16, a threshold value ΔVth may be predetermined for the change rate ΔV of the voltage value V, instead of the threshold value Vth. In this case, the controller 66 may detect that the emission of the radiation 16 is started at time point tc at which the increasing rate ΔV of the voltage value V exceeds the threshold value ΔVth, and that the emission of the radiation 16 is ended at time point tf at which the absolute value of the decreasing rate ΔV of the voltage value V exceeds the threshold ΔVth.

Further, in a case where on some areas, the emission of the radiation 16 is detected while on the other areas, the emission thereof is not detected, at a stage where the emission thereof is detected on the areas (or after the elapse of a certain period of time from the time point tc at which the start of the emission of the radiation 16 is detected), the controller 66 may stop supply of power to the reading circuits 68 corresponding to the other areas where the emission of the radiation 16 is not detected.

As described above, even if the radiation 16 is not applied to the radiographic image capturing system 10A, dark electric charges are generated and accumulated in the photoelectric conversion elements 48 due to thermal excitation or the like caused by heat of the photoelectric conversion elements 48. Then, electric currents caused by the dark electric charges flow into the bias lines 88, 90, and are converged into the common lines 92, 94. As a result, even if the radiation 16 is not applied to the radiographic image capturing system 10A, weak electric current flows through the common lines 92, 94, and the voltage value Va corresponding to the dark current is output from the current detector 62.

Next, a process will be explained below in which after the emission of the radiation 16 is detected for each area by the above processes, the controller 66 reads out electric signals from the area irradiated with the radiation 16 thereby to obtain image data, and further the controller produces thinned-out image data based on the obtained image data and sends the produced thinned-out image data to the system controller 24.

In the following description, by way of example, a case will be explained in which radiation 16 is applied only to the area A of the two areas A, B for a radiographic image capturing process, so that it is possible to easily distinguish a process with respect to the area irradiated with the radiation 16 (i.e., the area for use in the radiographic image capturing process) and a process with respect to the area not irradiated with the radiation 16 (i.e., the area not for use in the radiographic image capturing process). However, even in a case where the radiation 16 is applied to the area B for the radiographic image capturing process, or even in a case where the radiation 16 is applied to both the areas A, B (i.e., the entire area of the detector section P) for the radiographic image capturing process, it is a matter of course that the same processes as the processes to be described later are performed.

First, the controller 66 turns off the charge-reset switches SW1 of the amplifying circuits 70 of the reading circuit 68A corresponding to the image capturing region for the radiographic image capturing process, i.e., the area A on which the emission of the radiation 16 is detected (step S25), and sends signals to the CDS circuits 80 of the reading circuit 68A. The CDS circuits 80 receive the signals, and hold the voltage values Vin output from the amplifying circuits 70 at this stage, as explained with reference to FIG. 12.

Then, the controller 66 controls the gate drive circuit 65 to apply the voltage for signal-readout to one of the gate lines 50, thereby to open the gates of the TFTs 54 whose gate electrodes G are connected to the one gate line 50.

Then, electric charges accumulated in the photoelectric conversion elements 48 connected to the TFTs 54 on the one gate line 50 to which the voltage for signal-readout is applied, are read out as electric signals from the electric conversion elements 48 into the signal lines 52 through the source electrodes S and the drain electrodes D of the TFTs 54.

Then, in the reading circuit 68A corresponding to the area A on which the emission of the radiation 16 is detected, the electric signals output from the signal lines 52 are amplified in the amplifying circuits 70 and accumulated in the capacitors 70b of the amplifying circuits 70 (step S26).

Next, after the capacitors 70b of the amplifying circuits 70 accumulate the electric charges read out from the photoelectric conversion elements 48 in the area A irradiated with the radiation 16, the controller 66 outputs, to the gate drive circuit 65, a signal for applying a non-readout voltage (i.e., voltage for holding signals) to the gate line 50, thereby to close the gates of the TFTs 54. Also, the controller 66 sends the similar signal to the CDS circuits 80 in the reading circuit 68A corresponding to the area A on which the emission of the radiation 16 is detected.

The CDS circuits 80 receive the signals, and hold the voltage values Vout output from the amplifying circuits 70 at this stage, as shown in FIG. 12. Then, each of the CDS circuits calculates the difference Vout−Vin between the voltage values Vin, Vout output from the amplifying circuits 70 and outputs the difference therebetween (step S27).

The electric signals, i.e. the differences Vout−Vin, output from the CDS circuits 80 in the reading circuits 68A corresponding to the area A on which the emission of the radiation 16 is detected, are sequentially sent to the A-D converter 84 through the multiplexer 82, and are sequentially converted into digital values in the A-D converter 84 (step S28). The A-D converter 84 sends the electric signals of the photoelectric conversion elements 48 to the controller 66, which stores the electric signals in the memory 66m.

Subsequently, if reading of the electric signals is not ended with respect to all the photoelectric conversion elements 48 in the area A on which the emission of the radiation 16 is detected (step S29; NO), then the controller 66 turns on the charge-reset switches SW1 of the amplifying circuits 70 in the reading circuit 68A corresponding to the area A on which the emission of the radiation 16 is detected (step S30), thereby to discharge and eliminate the charges accumulated in the capacitors 70b of the amplifying circuits 70. Thereafter, the controller 66 turns off the charge-reset switches SW1 of the amplifying circuits 70, and controls the gate drive circuit 65 to apply the voltage for signal-readout to another gate line 50. Then, the processes from step S25 are repeated.

On the other hand, if reading of the electric signals is ended with respect to all the photoelectric conversion elements 48 in the area A on which the emission of the radiation 16 is detected (step S29; YES), then the controller 66 performs necessary processes such as a process for discharging electric charges remaining in the photoelectric conversion elements 48 and the amplifying circuits 70, and ends the process for reading out the electric signals from the photoelectric conversion elements 48.

Next, the controller 66 performs, if necessary, various correcting processes such as offset/gain correction, defect correction, etc. on data obtained in the reading process, thereby to produce image data, and stores the image data in the memory 66m. Further, the controller 66 thins out pixel data from the produced image data at a certain ratio thereby to produce thinned-out image data (step S31). Then, the controller 66 sends the produced thinned-out image data to the system controller 24 through the communication unit 76 (step S32), and the processes are ended.

Although illustration is omitted in the flowchart of FIG. 15, in a case where the controller 66 receives, from the system controller 24, an instruction signal for requesting to send the original image data of the thinned-out image data after the controller 66 has sent the thinned-out image data to the system controller 24, the controller 66 reads out the original image data stored in the memory 66m, and sends the original image data to the system controller 24 through the communication unit 76.

As described above, the controller 66 obtains image data only from the area A irradiated with the radiation 16 (i.e., the area A used for the radiographic image capturing process). Further, the controller 66 produces thinned-out image data and original image data thereof only on the area A irradiated with the radiation 16, and outputs them to the system controller 24.

Incidentally, if the controller 66 detects the emission of the radiation 16 on all the areas (i.e., the area A and the area B), then the controller 66 produces image data (thinned-out image data and original image data thereof) while regarding the areas A and B as one image capturing area, and sends them to the system controller 24.

Also, in a case where the thinned-out image data and the original image data thereof are sent to the system controller 24, the electronic cassette 20 may send, to the system controller 24, information indicating which area the image data correspond to, i.e., which area has been used for the radiographic image capturing process, together with the thinned-out image data and the original image data thereof.

Also, in a case where there is an area on which the emission of the radiation 16 is not detected, the electronic cassette 20 may notify the system controller 24 that the emission of the radiation 16 is not detected on the area.

In actuality, in a case where the system controller 24 receives thinned-out image data sent from the electronic cassette 20A, the system controller 24 performs necessary image processing on the received thinned-out image data, produces a preview image (thinned-out image) as a radiographic image, and displays the preview image on the display device 28.

The user sees the preview image (thinned-out image) displayed on the display device 28 of the system controller 24, and confirms whether re-capturing is required or not. If re-capturing is not required, the user operates the console 26 to instruct sending of the original image data of the thinned-out image data.

The system controller 24 is instructed to send the original image data of the thinned-out image data, and then sends an instruction signal for requesting to send the original image data, to the electronic cassette 20A.

Based on the instruction signal for requesting to send the original image data, the electronic cassette 20A sends the original image data to the system controller 24 through the communication unit 76. The system controller 24 receives the original image data, and performs necessary image processing on the received original image data to produce a radiographic image for diagnosis. The produced image is displayed on the display device 28, and is recorded on an image recording medium such as a film by an imager.

As described above, in the cassette 20A of the radiographic image capturing system 10A according to the other embodiment, the detector section P is divided into a plurality of areas, for example, two areas A, B, and the controller 66 detects the emission of the radiation 16 for each area A, B separately, based on the voltage value V output from the first current detector 62A corresponding to the area A and the voltage value V output from the second current detector 62B corresponding to the area B. Further, of the areas A, B of the detector section P, only the area on which the emission of the radiation 16 is detected, i.e., the area used for the radiographic image capturing process, is subjected to the process for reading out image signals, the process for storing image data in the memory 66m, and the process for sending image data to the system controller 24.

Thus, in a case where the radiation 16 is applied only to a certain area by using an irradiation field stop, image data not on the entire area of the detector section P, but only on the area irradiated with the radiation 16, i.e. only image data required for judging whether re-capturing is required or not, diagnosing, etc. is read out, stored in the memory 66m of the electronic cassette 20A, and sent to the system controller 24.

On the other hand, the other areas, i.e. the area not used for the radiographic image capturing process and which is not irradiated with the radiation 16, is not subjected to the process for reading out image signals, the process for storing image data in the memory 66m, or the process for sending image data to the system controller 24.

Thus, image data unnecessary for the task of judging whether or not recapturing is required, diagnosing, etc. is not subjected to the process for reading, the process for storing in the memory 66m, or the process for sending to external devices. Therefore, wasted time, wasted memory capacity, wasted electric power are reduced, and the radiographic image capturing process can be performed efficiently.

Also, since only image data on the area irradiated with the radiation 16 is sent to the system controller 24, it is not necessary to waste time for sending useless image data not used for the radiographic image capturing process or for receiving such useless image data to the system controller 24. Thus, time required for sending and receiving image data can be reduced.

Thus, the system controller 24 can receive only image data used for the radiographic image capturing process more quickly and display an image based on such image data swiftly, and therefore the system is easy for an operator or a patient to use.

In particular, since the system controller 24 receives thinned-out image data sent from the electronic cassette 20A at an early stage, the system controller 24 can display a preview image based on the thinned-out image data quickly. Thus, the user can judge early whether re-capturing is required or not, and the burden on the user and the subject 14 such as a patient can be reduced.

Although certain preferred embodiments of the present invention have been shown and described in detail, it is to be understood that the present invention is not intended to be limited to the above embodiments.

Figure 16:
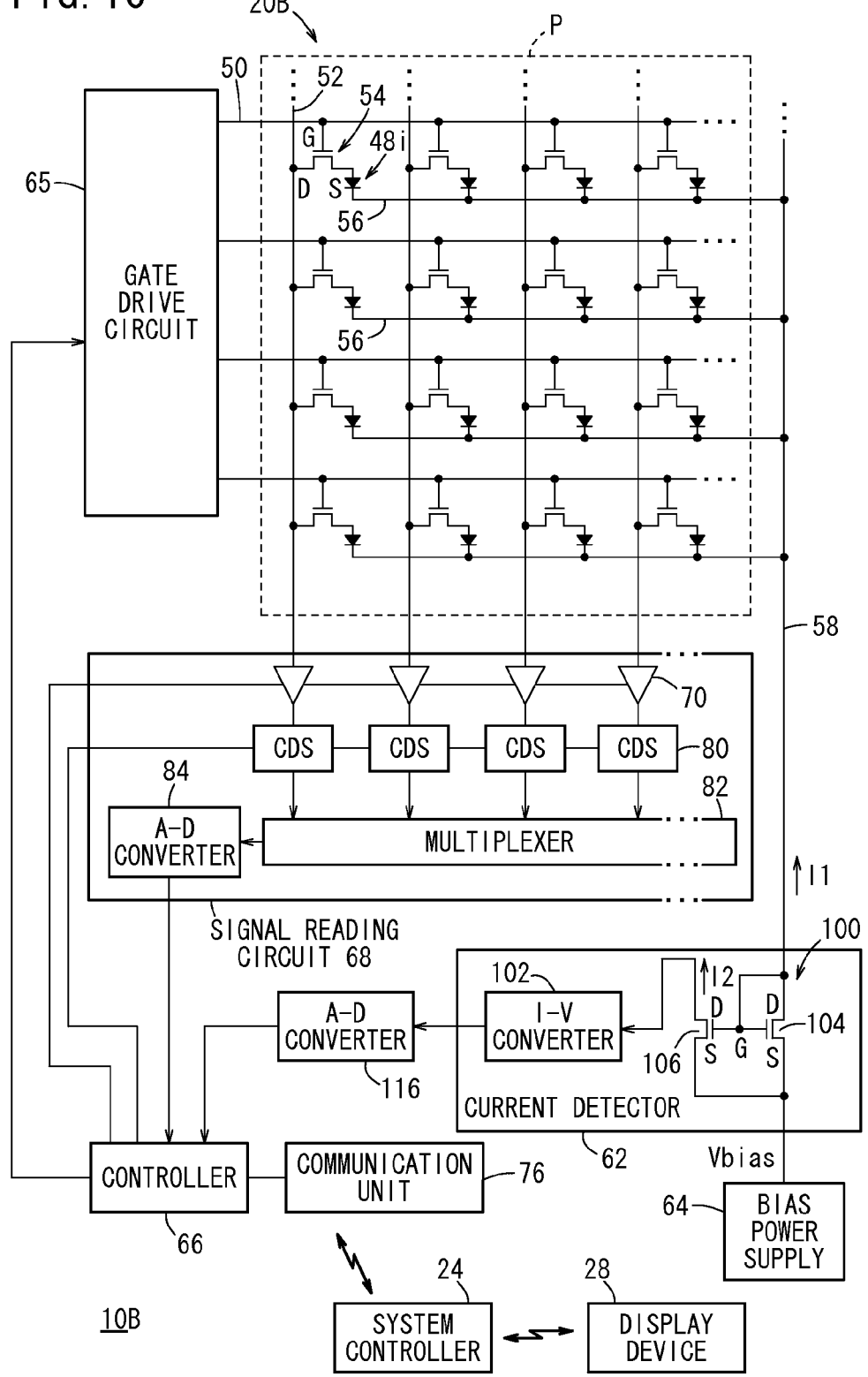
FIG. 16 is a circuit diagram, partly in block form, of a radiographic image capturing system incorporating a radiographic image detecting apparatus according to a modification.

For example, FIG. 16 is a circuit diagram of a radiographic image capturing system 10B incorporating an electronic cassette 20B (radiographic image detecting apparatus) according to a modification. As described above, PIN diodes of the photoelectric conversion elements 48 are formed in the reversed stacking order (i.e., the polarity of the photo electric conversion elements 48 are reversed), and thus the cathode electrodes are connected to the bias lines 56. In this case, the bias power supply 64 applies a positive voltage (which only needs to be a predetermined voltage higher than that of the anode electrode) as a reverse bias voltage to the cathode electrodes of the photoelectric conversion elements 48$i$. In FIG. 16, the direction in which the photoelectric conversion elements 48$i$ are connected to the bias power supply 64 is opposite to the direction in FIGS. 4 and 5, and also the current mirror circuit 100 has the different polarity. The radiographic image capturing system 10B incorporating the thus-constructed electronic cassette 20B is encompassed in the scope of the present invention.

Also, as described above, the present invention is applicable to a direct conversion radiographic image detecting apparatus wherein photoelectric conversion elements directly generate electric charges in response to the radiation 16 applied thereto and convert the generated electric charges into electric signals, without the use of the scintillator 44.

The photoelectric conversion element that is applicable to such a direct conversion radiographic image detecting apparatus includes a semiconductor of amorphous selenium (a-Se), CdTe, CdZnTe, $Cd_xZn_{1-x}Te$ (for example, $Cd_{0.8}Zn_{0.2}Te$), CdSe, $HgI_2$, $PbI_2$, PbO, TlBr (thallium bromide), GaAs, GaP, $Bi_xMO_y$ (where M includes at least one of Ge, Si, Ti, x satisfies an expression of $10 \le x \le 14$, and y represents the stoichiometric number of oxygen atoms determined by the above M and x. For example, it includes $Bi_{12}MO_{20}$ (where M includes at least one of Ge, Si, Ti)), etc.

As is known in the art, the direct conversion photoelectric conversion element is formed such that a photoelectric conversion layer (i.e. photoelectric conversion elements) is interposed between a plurality of pixel electrodes formed on a glass substrate or the like and a common bias electrode, and each pixel electrode is connected to a TFT and a capacitor having one end grounded. To the common bias electrode, one end of a bias line is connected. The other end of the bias line is connected to a high-voltage bias power supply through a current detector comprising a current mirror. The bias power supply applies a positive high voltage as a forward bias voltage to the common bias electrode through the current mirror and the bias line in the forward direction.

As described above, it should be understood that various changes and modifications may be made to the embodiment without departing from the scope of the invention as set forth in the appended claims.

What is claimed is:

1. A radiographic image detecting apparatus comprising:
   a plurality of photoelectric conversion elements for generating electric charge by emission of radiation;
   a bias line through which a bias voltage is supplied to the photoelectric conversion elements;
   a power supply for applying the bias voltage to the photoelectric conversion elements through the bias line;
   a current detector for detecting a bias current flowing through the bias line; and
   a reading circuit including an amplifying circuit having a gain, wherein in a case where an electric signal due to the electric charge is read out from the photoelectric conversion elements through a signal line, the gain at a time of reading out the electric signal is set based on a current value detected by the current detector at a time of emission of the radiation,
   wherein the current detector includes a current mirror circuit connected between the bias line connected to the photoelectric conversion elements and the power supply.

2. The radiographic image detecting apparatus according to claim 1, wherein the current mirror circuit includes:
   an input device connected to the photoelectric conversion elements and through which an input current flows; and
   output devices for mirroring the input current flowing through the input device and flowing an output current, and
   wherein the output devices are connected in parallel to each other such that the current mirror circuit is a multistage current mirror circuit.

3. The radiographic image detecting apparatus according to claim 1, wherein the current mirror circuit includes:
   an input MOSFET connected to the photoelectric conversion elements and through which an input current flows; and
   an output MOSFET for mirroring the input current flowing through the input MOSFET and flowing an output current, and
   wherein the value of width/length of the channel of the input MOSFET is larger than the value of width/length of the channel of the output MOSFET.

4. The radiographic image detecting apparatus according to claim 1, wherein the current mirror circuit is arranged on a substrate with the photoelectric conversion elements arranged thereon.

5. The radiographic image detecting apparatus according to claim 1, wherein the current mirror circuit is formed as an integrated circuit.

6. The radiographic image detecting apparatus according to claim 1, wherein the current detector includes:
   the current mirror circuit; and
   a current-voltage converting circuit connected to the current mirror circuit, and
   wherein the current mirror circuit and the current-voltage converting circuit are formed as one integrated circuit.

7. The radiographic image detecting apparatus according to claim 6, wherein the current-voltage converting circuit includes an operational amplifier and a resistor connected to an input terminal and an output terminal of the operational amplifier, or the current-voltage converting circuit is formed as a charge amplifier including an operational amplifier and a capacitor connected to the input terminal and the output terminal of the operational amplifier.

8. The radiographic image detecting apparatus according to claim 1, wherein the controller detects start and/or end of emission of the radiation based on increase and decrease in a current flowing through the bias line detected by the current detector.

9. The radiographic image capturing system comprising:
   the radiographic image detecting apparatus according to claim 1; and
   an image processor for forming a radiographic image based on electric signals which are read out from the photoelectric conversion elements and then amplified, the electric signals being output from the radiographic image detecting apparatus at the time of reading out the electric signal.

10. The radiographic image capturing system according to claim 9, wherein the radiographic image detecting apparatus and the image processor are connected to each other by a wireless communication.

11. A radiographic image detecting apparatus comprising:
    a detector section including a plurality of areas and on which a plurality of photoelectric conversion elements for generating electric charge depending on an applied amount of radiation are arranged in a two-dimensional array;
    a power supply for applying a bias voltage to the photoelectric conversion elements through bias lines;
    a current detector for detecting currents flowing through the bias lines, for each of the areas;
    a reading circuit for reading out electric charge generated and accumulated in the photoelectric conversion elements and converting the read electric charge into an electric signal, for each of the areas; and
    a controller for detecting start of emission of the radiation for each of the areas, based on increase in the currents flowing through the bias lines detected by the current detector, and for controlling the reading circuit to read out only the electric signal of the area on which the emission of the radiation is detected,
    wherein the current detector includes a current mirror circuit connected between the bias lines connected to the photoelectric conversion elements and the power supply.

12. The radiographic image detecting apparatus according to claim 11, wherein the current mirror circuit includes:
an input device connected to the photoelectric conversion elements and through which an input current flows; and
output devices for mirroring the input current flowing through the input device and flowing an output current, and
wherein the output devices are connected in parallel to each other such that the current mirror circuit is a multistage current mirror circuit.

13. The radiographic image detecting apparatus according to claim 11, wherein the current mirror circuit includes:
an input MOSFET connected to the photoelectric conversion elements and through which an input current flows; and
an output MOSFET for mirroring the input current flowing through the input MOSFET and flowing an output current, and
wherein the value of width/length of the channel of the input MOSFET is larger than the value of width/length of the channel of the output MOSFET.

14. The radiographic image detecting apparatus according to claim 11, wherein the current mirror circuit is arranged on a substrate with the photoelectric conversion elements arranged thereon.

15. The radiographic image detecting apparatus according to claim 11, wherein the current mirror circuit is formed as an integrated circuit.

16. The radiographic image detecting apparatus according to claim 11, wherein the current detector includes:
the current mirror circuit; and
a current-voltage converting circuit connected to the current mirror circuit, and
wherein the current mirror circuit and the current-voltage converting circuit are formed as one integrated circuit.

17. The radiographic image detecting apparatus according to claim 16, wherein the current-voltage converting circuit includes an operational amplifier and a resistor connected to an input terminal and an output terminal of the operational amplifier, or the current-voltage converting circuit is formed as a charge amplifier including an operational amplifier and a capacitor connected to the input terminal and the output terminal of the operational amplifier.

18. The radiographic image detecting apparatus according to claim 11, wherein the controller detects start and/or end of emission of the radiation based on increase and decrease in currents flowing through the bias lines detected by the current detector.

19. The radiographic image capturing system comprising:
the radiographic image detecting apparatus according to claim 11; and
an image processor for forming a radiographic image based on electric signals which are read out from the photoelectric conversion elements and then amplified, the electric signals being output from the radiographic image detecting apparatus at the time of reading out the electric signals.

20. The radiographic image capturing system according to claim 19, wherein the radiographic image detecting apparatus and the image processor are connected to each other by a wireless communication.

* * * * *